United States Patent
Sasaki et al.

(10) Patent No.: US 7,814,156 B2
(45) Date of Patent: Oct. 12, 2010

(54) MANAGEMENT OF ACCOUNT INFORMATION IN A NETWORK GAME SERVICE FOR MAIL EXCHANGE

(75) Inventors: Hideaki Sasaki, Kanagawa (JP); Shinji Hirao, Saitama (JP); Tadamichi Obinata, Kanagawa (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 1136 days.

(21) Appl. No.: 10/960,480

(22) Filed: Oct. 8, 2004

(65) Prior Publication Data
US 2005/0108342 A1    May 19, 2005

(30) Foreign Application Priority Data
Oct. 10, 2003 (JP) .......................... P2003-352821

(51) Int. Cl.
*G06F 15/16* (2006.01)
(52) U.S. Cl. ........................ 709/206; 709/228; 709/245; 463/41; 463/42; 726/4; 726/11; 726/27
(58) Field of Classification Search ................. 709/206, 709/245; 726/4, 11, 27; 463/41, 42
See application file for complete search history.

(56) References Cited

U.S. PATENT DOCUMENTS

| 6,988,127 B2 | 1/2006 | Matsuda et al. |
| 7,240,095 B1* | 7/2007 | Lewis .......................... 709/206 |
| 2002/0004821 A1* | 1/2002 | Togawa et al. .............. 709/206 |
| 2002/0016735 A1* | 2/2002 | Runge et al. .................... 705/14 |
| 2002/0016844 A1* | 2/2002 | Akasaka et al. .............. 709/228 |
| 2002/0073184 A1 | 6/2002 | Maeda et al. |
| 2002/0086730 A1* | 7/2002 | Nakai ........................... 463/41 |
| 2002/0143879 A1* | 10/2002 | Sommerer .................. 709/206 |
| 2003/0045360 A1* | 3/2003 | Hora ............................ 463/42 |

FOREIGN PATENT DOCUMENTS

| JP | 07-183890 | * | 7/1995 |
| JP | 7-183890 | | 7/1995 |

(Continued)

OTHER PUBLICATIONS

English Language Abstract of JP 2002-288059.

(Continued)

*Primary Examiner*—Thuong T Nguyen
(74) *Attorney, Agent, or Firm*—Greenblum & Bernstein P.L.C.

(57) ABSTRACT

A terminal operated by a user is connected to a server group, including a management server, a mail server, and a database server, via the Internet. In the database server, current account information, including a mail address of the user for mail exchange is registered. When the user registers a new mail address in the terminal, the new mail address is notified to the mail server and the database server. The database server updates the registered account information and also updates the account information registered in the mail server. The update of the account information in the server group is notified to the terminal. When the update of the account information is notified, the terminal apparatus requests the database server to send the account information. The terminal internally registers the account information sent from the database server in response to the request.

18 Claims, 14 Drawing Sheets

FOREIGN PATENT DOCUMENTS

| | | | |
|---|---|---|---|
| JP | 2001-320400 | * | 11/2001 |
| JP | 2002-215448 | * | 2/2002 |
| JP | 2002-91850 | | 3/2002 |
| JP | 2002-118618 | | 4/2002 |
| JP | 2002-140443 A | | 5/2002 |
| JP | 2002-215448 | * | 8/2002 |
| JP | 2002-251377 | | 9/2002 |
| JP | 2002-288059 | | 10/2002 |
| WO | 00/19323 | | 4/2000 |

OTHER PUBLICATIONS

U.S. Appl. No. 10/960,577 to Kashitani et al., filed Oct. 8, 2004.
U.S. Appl. No. 10/960,511 to Hirao et al., filed Oct. 8, 2004.

English language Abstract of JP 7-183890.
English language Abstract of JP 2001-320400.
English language Abstract of JP 2002-118618.
English language Abstract of JP 2002-91850.
English language Abstract of JP 2002-215448.
English language Abstract of JP 2002-251377.
English language Abstract and partial translation of JP 2002-140443 A.
English language partial translation of WO 00/19323.

* cited by examiner

| | | EXAMPLE |
|---|---|---|
| 301 | USER ID | aaa12345 |
| 302 | PASSWORD | abcdefgh |
| 303 | MAIL ADDRESS | user1@pol.com |
| 304 | MAIL PASSWORD | ijklmnop |
| 305 | EXTENDED MAIL ADDRESS 1 | chara1@world1.game1.pol.com |
| | EXTENDED MAIL ADDRESS 2 | chara2@world2.game1.pol.com |
| | EXTENDED MAIL ADDRESS 3 | chara3@world3.game1.pol.com |
| | EXTENDED MAIL ADDRESS 4 | chara5@game2.pol.com |
| | EXTENDED MAIL ADDRESS 5 | — |
| 306 | EXTENSION SERVICE AVAILABLE/UNAVAILABLE FLAG | POSSIBLE |
| 307 | POP SERVER NAME | po000.pol.com |
| 308 | POP SERVER PORT NUMBER | 110 |
| 309 | SMTP SERVER NAME | ma000.pol.com |
| 310 | SMTP SERVER PORT NUMBER | 25 |
| 311 | FINAL UPDATE DATA AND TIME | 2003/09/01 0:00 |

| | | EXAMPLE | | |
|---|---|---|---|---|
| 351 | USER ID | aaa12345 | aaa12345 | aaa12345 |
| 352 | GAME NAME | game1 | game1 | game2 --- |
| 353 | CHARACTER NAME | chara1 | chara2 | chara5 |
| 354 | WORLD NAME | world1 | world2 | — |

MANAGEMENT OF ACCOUNT INFORMATION IN A NETWORK GAME SERVICE FOR MAIL EXCHANGE

CROSS-REFERENCE TO RELATED APPLICATION

The present disclosure relates to subject matter contained in Japanese Patent Application No. 2003-352821, filed on Oct. 10, 2003, the disclosure of which is expressly incorporated herein by reference in its entirety.

BACKGROUND OF THE INVENTION

1. Field of the Invention

The present invention relates to e-mail. More specifically, the present invention relates to a technique for managing account information necessary for providing a function of mail exchange between a server and a terminal apparatus (client).

2. Description of the Related Art

Conventionally, in order to execute mail exchange between users via a mail server, a mail application for transmitting/receiving mail from/to the mail server is used in a terminal apparatus. In the mail application, account information including information of a mail address and a mail server is registered. When the mail address is changed and/or the mail server used for mail exchange is changed, the user manually registers the changed account information in the mail application.

When account information registered in the mail application is corrupted for some reason, the user has to manually reregister account information in the mail application. When the user changes the terminal apparatus used for mail exchange, the user has to register account information in the mail application that is run in a new terminal apparatus. Unexamined Japanese Patent Publication 2002-288059 discloses an electronic device including an USB interface for easily registering account information in the mail application of the terminal apparatus.

Since the user has to manually register account information in the conventional mail application, there is a problem in which too much time is taken. Even when the electronic device of the above patent document is used, registration of at least the first account information has to be manually executed by the user. When the user operates a different terminal apparatus for mail exchange, the user has to register account information in the mail application of the new terminal apparatus. Thus, the user has to memorize or record the account information.

As a matter of fact, if the user once registers account information in the mail application and copies account information to the electronic device disclosed in the above patent document, the account information can be registered in the mail application of the new terminal apparatus based on the account information copied onto the electronic device. However, in the case where the account information is changed, the account information copied onto the electronic device is not the most current information. In this case, it is impossible to use the account information copied onto the electronic device. Therefore, the above problem is not solved.

SUMMARY OF THE INVENTION

An object of the present invention is to provide an account information management system that enables a user to easily set suitable account information in his/her own terminal apparatus.

In order to attain the above object, an account information management system according to a first aspect of the present invention includes a server that provides at least a service of mail exchange and a client connected to the server via a network. The server includes a server side account information storage that stores account information used for mail exchange by a user. The server further includes an account information transmitter that transmits the account information stored in the server side account information storage to the client via the network. The server further includes a server side mail exchange processor that executes processing for mail exchange with the client based on the account information stored in the server side account information storage.

The client includes an account information receiver that receives the transmitted account information. The client further includes a client side account information storage that stores the received account information. The client further includes a client side mail exchange processor that executes processing for mail exchange with the server based on the account information stored in the client side account information storage.

In the above account information management system, the server performs processing for mail exchange based on the account information stored in the server side account information storage. The client performs processing for mail exchange based on the account information stored in the client side account information storage.

The account information stored in the client side account information storage becomes the same as that stored in the server side account information storage by transmitting the account information from the server to the client. Since the user does not have to set the account information manually, the account information of the client can be easily set. Even when the user changes the client to be used, suitable account information can be set in the client by transmitting the account information from the server to the client. Thus, the user can easily perform mail exchange using an arbitrary client.

In order to attain the above object, an account information management server according to a second aspect of the present invention is connected to a client operated by a user via a network. The account information management server includes an account information storage that stores account information used for mail exchange. The account information management server further includes an account information transmitter that transmits the stored account information to the client via the network. The account information management server further includes a mail exchange processor that executes mail exchange with the client based on the stored account information.

In order to attain the above object, an account information management server according to a third aspect of the present invention is connected via a network to a client operated by a user. The account information management server includes a program memory that stores a program, a data memory that stores data, a processor that executes the program, and a communications apparatus that performs communications processing with the client. The data memory has an account information storage area that stores account information used for mail exchange by the user.

The program causes the processor to manage current account information in the account information storage area. The program further causes the processor to transmit the managed account information to the client via the network. The program further causes the processor to perform processing for mail exchange with the client based on the managed account information.

In the account information management server according to the above third aspect, the program stored in the memory can be recorded on a computer-readable storage medium. The computer-readable storage medium may be attachable and detachable to and from the computer apparatus and provided separately from the computer apparatus. The computer-readable storage medium may be a fixed disk, which is provided in the computer apparatus and provided together with the computer apparatus. In the account information management server according to the third aspect, the program stored in the memory can be distributed via a network from the server apparatus residing on the network after superimposing a data signal of the program on a carrier wave.

In order to attain the above object, a terminal apparatus according to a fourth aspect of the present invention is connected via a network to a server that provides at least a service of mail exchange and manages current account information. The terminal apparatus includes an account information receiver that receives account information, which is used for mail exchange and managed by the server, from the server. The terminal apparatus further includes an account information storage that stores the received account information. The terminal apparatus further includes a mail exchange processor that executes processing for mail exchange with the server based on the stored account information.

In order to attain the above object, a terminal apparatus according to a fifth aspect of the present invention is connected via a network to a server that provides at least a service of mail exchange and manages current account information. The terminal apparatus includes a program memory that stores a program, a data memory that stores data, a processor that executes the program, and a communications apparatus that performs communications processing with the server. The data memory has an account information storage area that stores account information used for mail exchange by a user. The program causes the processor to receive account information, which is managed by the server, from the server. The program further causes the processor to store the received account information in the account information storage area. The program further causes the processor to perform processing for mail exchange with the server based on the stored account information.

In the terminal apparatus according to the above fifth aspect, the program stored in the memory can be recorded on a computer-readable storage medium. The computer-readable storage medium may be attachable and detachable to and from the computer apparatus and provided separately from the computer apparatus. The computer-readable storage medium may be a fixed disk, which is provided in the computer apparatus and provided together with the computer apparatus. In the terminal apparatus according to the fifth aspect, the program stored in the memory can be distributed via a network from the server apparatus residing on the network after superimposing a data signal of the program on a carrier wave.

In order to attain the above object, an account information managing method according to a sixth aspect of the present invention method is executed between a server that provides at least a function of mail exchange and a client connected to the server via a network. The account information managing method manages current account information, which is used for mail exchange by a user, in the server. The account information managing method transmits the managed account information from the server to the client via the network. The account information managing method stores the account information transmitted from the server in the client. The account information managing method performs processing for mail exchange between the server and the client based on the account information managed in the server and the account information stored in the client.

BRIEF DESCRIPTION OF THE DRAWINGS

FIG. 4A is a view illustrating an account information table for using mail exchange service provided by a mail server according to an embodiment of the present invention;

FIG. 4B is a view illustrating a character information table for using mail exchange service provided by a mail server according to an embodiment of the present invention;

DETAILED DESCRIPTION OF PREFERRED EMBODIMENT

Embodiments of the present invention will be specifically described with reference to the drawings.

Figure 1:
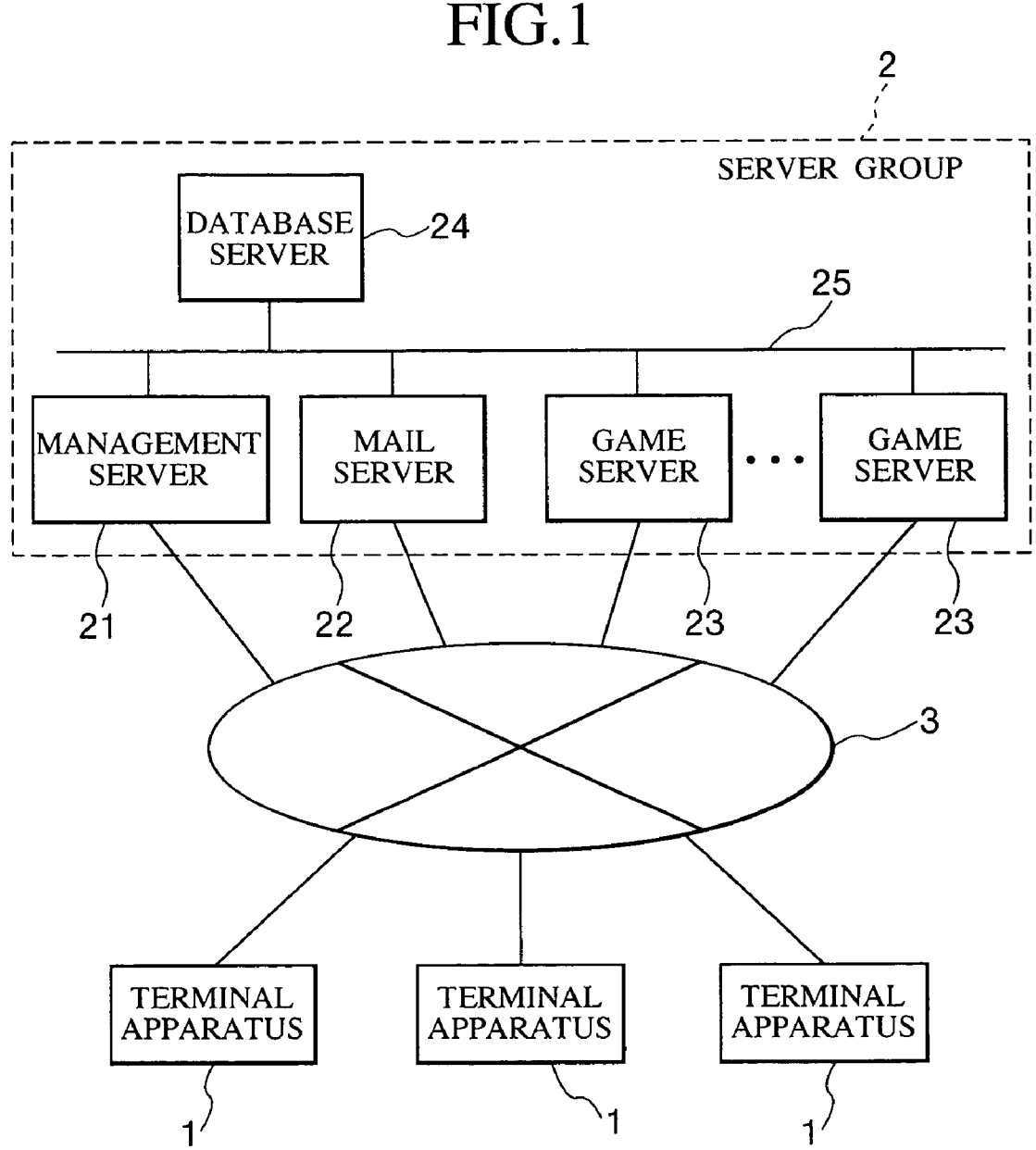
FIG. 1 is a block diagram illustrating an overall configuration of a network system according to an embodiment of the present invention.

FIG. 1 is a block diagram illustrating an overall configuration of a network system according to an embodiment of the present invention. As illustrated in the figure, this network system includes multiple terminal apparatuses 1 and a server group 2. The server group 2 includes a management server 21, a mail server 22, multiple game servers 23 and a database server 24, which are connected to one another via an LAN (Local Area Network) 25. The management server 21, the mail server 22, and the game servers 23 are connected to a terminal apparatus 1 via an Internet 3.

The service provided by the server group 2 is membership service that can be offered to only a user (hereinafter simply referred to as user), who has registered for membership in advance. The terminal apparatus 1 is a client terminal that is used by each user in order to use network game service and mail exchange service provided by the server group 2. It is possible to use a video game apparatus having a function of connecting to the Internet 3, in addition to a general-purpose personal computer. The configuration of the terminal apparatus 1 will be specifically described later.

The management server 21 is a server that executes processing for user membership registration and processing for authentication of the registered user. Though the user is required to register a user name at the time of membership registration, the exact same user name as the user name that has already been registered by another user cannot be registered. Among the services provided by the server group 2, the management server 21 also executes management of the services used by each user and management of each user profile.

The mail server 22 provides a mail exchange server to the user. As the mail address that can be used in the mail exchange service, there is a standard mail address given to all member-registered users and an extended mail address (to be specifically described later) given to only the user who uses an extension service. In the mail server 22, a mailbox for storing a received mail is provided for each user. A mail addressed to the same user is stored to the same mailbox regardless of a mail address designated as a destination ("to", "cc", or "bcc").

The game server 23 provides the network game service to the user. A game server 23 is provided for each network game offered to the user. There is a case in which multiple game servers 23 provide the same type of network game. In the case where multiple game servers 23 provide the same type of network game, a difference among the multiple game servers 23 is distinguished by a concept of world. The user can set a character name for each network game (or world), which he/she arbitrarily plays, change or delete the character name.

The database server 24 is a server that manages data used in common by each of the servers 21 to 23 of the server group 2. Though data having the same contents as those of data managed by the database server 24 is also managed by the respective servers 21 to 23 in some cases, data managed by the database server 24 is treated as original data. The configuration of the servers 21 to 24 will be specifically described later.

Figure 2:
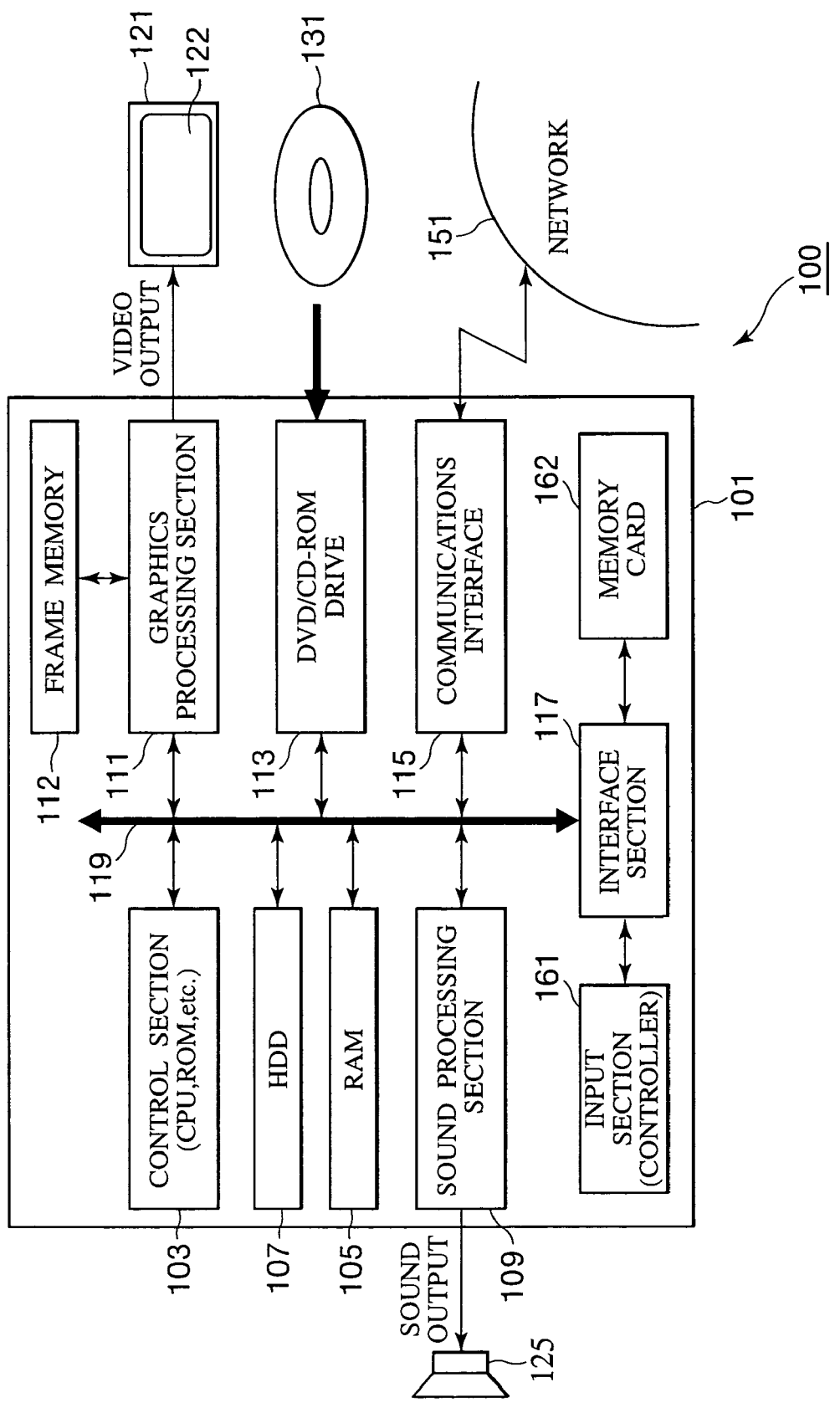
FIG. 2 is a block diagram illustrating a configuration of a terminal apparatus according to an embodiment of the present invention.

FIG. 2 is a block diagram illustrating a configuration of a terminal apparatus according to an embodiment of the present invention. This figure illustrates a configuration when a video game apparatus is applied as a terminal apparatus 1. Even when a general-purpose personal computer is applied, any apparatus may be substituted if the same function is realized. As illustrated in FIG. 2, the terminal apparatus 1 to which this video game apparatus is applied includes a control section 103, a RAM (Random Access Memory) 105, a hard disk drive (HDD) 107, a sound processor 109, a graphics processor 111, a DVD/CD-ROM drive 113, a communications interface 115, and an interface section 117, which are connected to an internal bus 119.

The sound processor 109 is connected to a sound output device 125, which is a speaker, and the graphics processor 111 is connected to a display device 121 having a display screen 122. A storage medium (DVD-ROM or CD-ROM) 131 can be attached to the DVD/CD-ROM drive 113. The communications interface 115 is connected to a network (Internet 3 in this case). An input section (controller) 161 and a memory card 162 are connected to the interface section 117.

The control section 103 includes a CPU (Central Processing Unit), a ROM (Read Only Memory), etc., and executes a program stored on the HDD 107 or the storage medium 131 to control the terminal apparatus 1. The control section 103 has an internal timer. The RAM 105 is a work area for the control section 103. The HDD 107 is a storage area for storing a program and data, and an account information table to be described later is stored therein. In the case where a program executed by the control section 103 instructs the sound processor 109 to output a sound, the sound processor 109 interprets the instruction and outputs a sound signal to the sound output device 125.

The graphics processor 111 develops an image onto the frame memory 112 and outputs a video signal, which displays the image on the display screen 122 of the display device 121 according to a drawing command output from the control section 103. It is assumed that one frame time of the image included in the outputting video signal is, for example, 1/30 sec. The DVD/CD-ROM drive 113 reads the program and data from the storage medium 131. The communications interface 115 is connected to the network (Internet 3) to perform communications with other computers.

The interface section 117 outputs input data sent from the input section 161 to the RAM 105. The control section 103 interprets the input data sent from the input section 161 to carry out arithmetic processing. The input section 161 includes a directional key and multiple operation keys. The directional key is used to move a player character and a cursor. The operation button is used to instruct an operation of the player character and select an item displayed by the cursor. The interface section 117 forwards data, indicative of the progress of the game stored in the RAM 105, to the memory card 162 based on the instruction from the control section 103. The interface section 117 reads data of the game stored in the memory card 162 at the time of stopping the game, and transfers the read data to the RAM 105.

A mail message can be input from a software keyboard, and the directional key and the operation button are also used to operate the software keyboard. A hardware keyboard may be connected to the interface section 117 to make it possible to input the mail message and the like from the hardware keyboard. The interface section 117 also outputs input data sent from the hardware keyboard to the RAM 105.

The program and data for performing the game by the terminal apparatus 1 and mail exchange are first stored on, for example, the storage medium 131. The program and data are read by the DVD/CD-ROM drive 113 and loaded onto the RAM 105 at the time of execution. The control section 103 processes the program and data loaded onto the RAM 105, outputs a drawing command to the graphics processor 111, and outputs an instruction of a sound output to the sound processor 109. Intermediate data is stored in the RAM 105 while the control section 103 performs processing.

Figure 3:
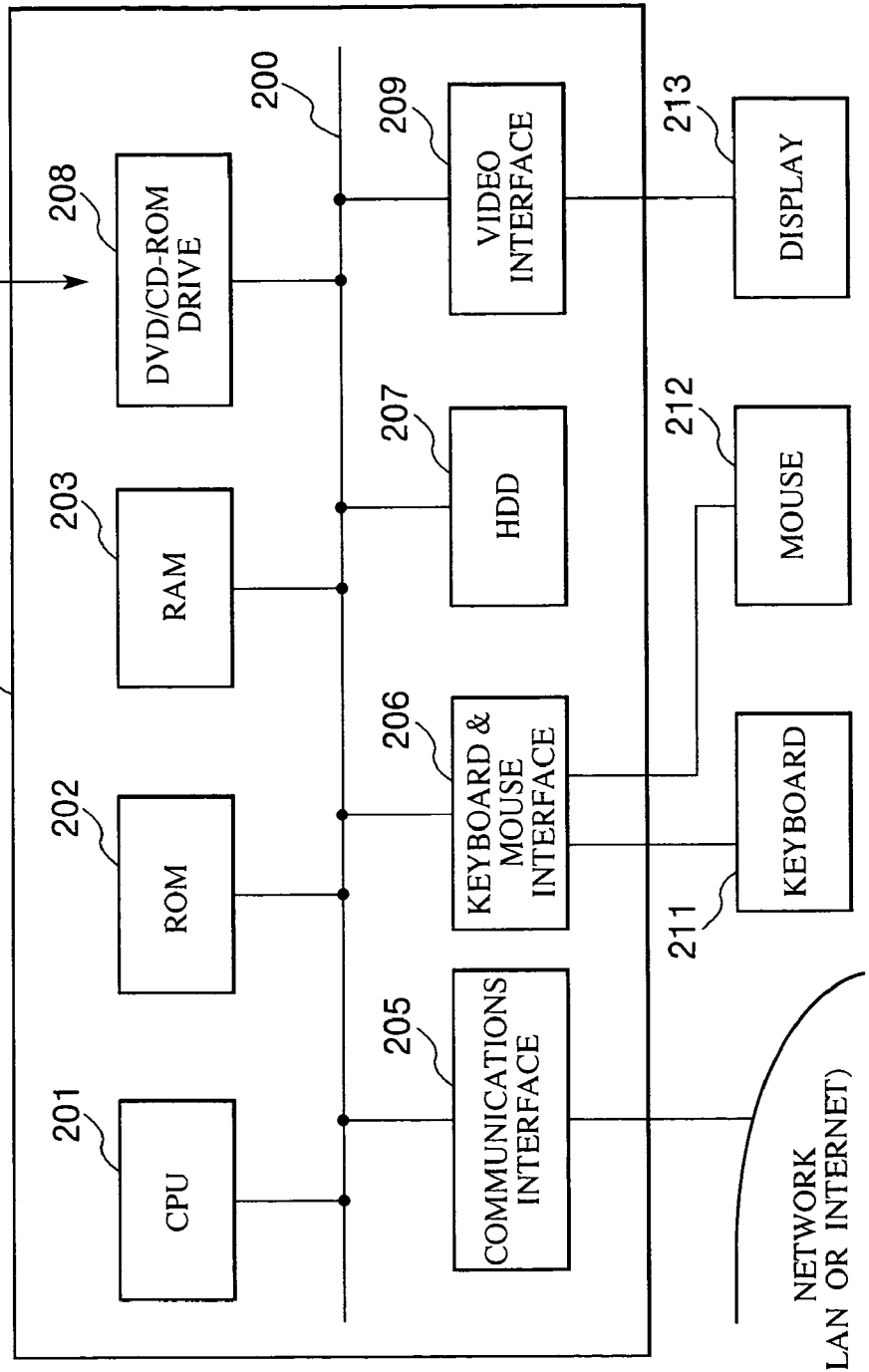
FIG. 3 is a block diagram illustrating a configuration of each server according to an embodiment of the present invention.

FIG. 3 is a block diagram illustrating the configuration of each of the servers 21 to 24. As illustrated in the drawing, each of the servers 21 to 24 includes a CPU 201, a ROM 202, a RAM 203, a communications interface 205, a keyboard and mouse interface 206, an HDD 207, a DVD/CD-ROM drive 208, and a video interface 209, which are connected to an internal bus 200.

A keyboard 211 and a mouse 212 are connected to the keyboard and mouse interface 206. A display 213 is connected to the video interface 209. The communications interface 205 is connected to an external network. The network to which the communications interface 205 is connected includes both the LAN 25 and the Interface 3 in the case of the servers 21 to 23, and the LAN 25 in the case of the database 24. A storage medium 220 can be attached to the DVD/CD-ROM drive 208.

The CPU 201 executes programs stored in the ROM 202, the RAM 203, and the HDD 207 to carry out the functions of the services provided by the respective servers 21 to 24. The ROM 202 stores a boot program of the CPU 201. The RAM 203 is used as a storage area of the program executed by the CPU 201, a data area, and a working area. The HDD 207 stores the program and data transferred from the storage medium 220 by the DVD/CD-ROM drive 208. In the HDD 207 of the mail server 22, a mailbox of the membership-registered user is provided.

The communications interface 205 is connected to the network (LAN 25, Internet 3) to perform communications with other servers 21 to 24 and the terminal apparatus 1. The keyboard and mouse interface 206 outputs input data from the keyboard 211 to the RAM 203. The CPU 201 interprets input data from the keyboard 211 to execute arithmetic processing. The video interface 209 outputs a video signal relating to image data as a processing result of the CPU 201 to the display 213.

An explanation is next given of data necessary for using a mail exchange service provided by the mail server 22 in this network system. In order to use the mail exchange service, account information is needed. Since a character name used by the user in the network game is available for a mail account of an extended mail address in the extension service, information relating to the character name is used.

FIG. 4A is a view illustrating an account information table for using the mail exchange service provided by the mail server 22. An account information table 300 is stored in each of the mail server 22, the database server 24, and the terminal apparatus 1. The account information table 300 stored in the database server 24 is an original. The account information table 300 stored in each of the database server 24 and the terminal apparatus 1 is a copy of the original.

In the account information table 300, a user ID 301, a password 302, a mail address 303, a mail password 304, an extended mail address 305, an extension service available/unavailable flag 306, a POP (Post Office Protocol) server name 307, a POP server port number 308, an SMTP (Simple-Mail Transfer Protocol) server name 309, an SMTP server port number 310, and a final update date and time 311 are registered.

The user ID 301 is a unique ID for each membership registered user, and is used as a key for identifying a user in processing of various kinds, in addition to be used for user login authentication. The mail server 22 has a mailbox to be associated with the user ID 301. The password 302 is a password used to authenticate a user login. The user ID and the password are also managed by the management server 21.

The mail address 303 is a standard mail address given to all membership-registered users. The mail address 303 is used as authentication information for authenticating a mail reception request and is essential for receiving mail exchange service provided by the mail server 22. The mail address 303 is sometimes called a standard mail address in order to contrast with the extended mail address 305 to be explained later. The mail password 304 is a password for reading a mail stored in the user mailbox of the mail server 22, and is used as authentication information for authenticating a mail reception request as well as the mail address 303.

The extended mail address 305 is a mail address including a character name used in the network game by the user as a mail account, and the user can use the extended mail address 305 in addition to the standard mail address 303. The user, who has registered the use of the extension service, can use up to five extended mail addresses 305 at the maximum, in the shown embodiment. The extension service available/unavailable flag 306 is a flag indicating whether the user registers the use of the extension service. The extension service available/unavailable flag 306 is set when the use of the extension service is registered.

The extended mail address 305 is generated based on information registered in a character information table 350. A format of the extended mail address 305 is as follows:
Character name@(world name.) game name.pol.com
A format of the standard mail address 303 is as follows:
User name@pol.com
Though a domain of the extended mail address 305 includes a network game name (and a world name), and a domain of the standard mail address 303 includes only "pol.com." A mail, which includes "pol.com" as the last domain, is sent to the mail server 22 via the Internet 3.

The POP server name 307 indicates a name of the POP server, and the POP server port number 308 indicates a port number of the POP server. The SMTP server name 309 indicates a name (address) of the SMTP server, and the SMTP server port number 310 indicates a port number of the SMTP server. The final update date and time 311 indicates a date and time at which the account information table 300 is finally updated in each of the mail server 22, the database server 24, and the terminal apparatus 1. The final update date and time 311 is used to adjust the account information tables 300 of the mail server 22 and the terminal apparatus 1 to the original account information table 300 of the database server 24

FIG. 4B is a view illustrating a character information table used when an extended mail address, which includes a character name as a mail account, is used. A character information table 350 is stored in each of the database server 24 and the mail server 22. The character information table 350 stored in the database server 24 is an original, and the character information table 350 stored in the mail server 22 is a copy of the original.

In the character information table 350, a user ID 351, a game name 352, a character name 353, and a world name 354 are registered. The user ID 351 is used as a key for identifying a user, similar to the user ID 301. The game name 352 indicates a name of the network game. The world name 354 indicates which game server 23 provides a game when the number of game servers 23, which provide the network game of the same kind, is more than one. When the number of game servers 23, which provide the network game of the same kind, is only one, the world name 354 is not registered. The character name 353 is a name of a character used in the network game (in the world when multiple game servers 23 provide the network game of the same kind) by the user.

An explanation is next given of setting of the extended mail address. When the user intends to use the extended mail address, the user must register the use of the extension service provided by the server group 2. In order to start the use of the extension service, the user gains access to the management server 21 from the terminal apparatus 1 to request the start of the extension service. The start of the extension service is notified to the database server 24 from the management server 21 in response to this request, and the procedure for ending the extension service is similarly executed and the extension service available/unavailable flag 306 is reset.

When the user has registered the use of the extension service, the extension service available/unavailable flag 306 is set and the user can use not only the standard mail address but also the extended mail address. Actually, in order to use the extended mail address, the user must set the extended mail address in addition to the registration of the use of the extension service.

Figure 5:
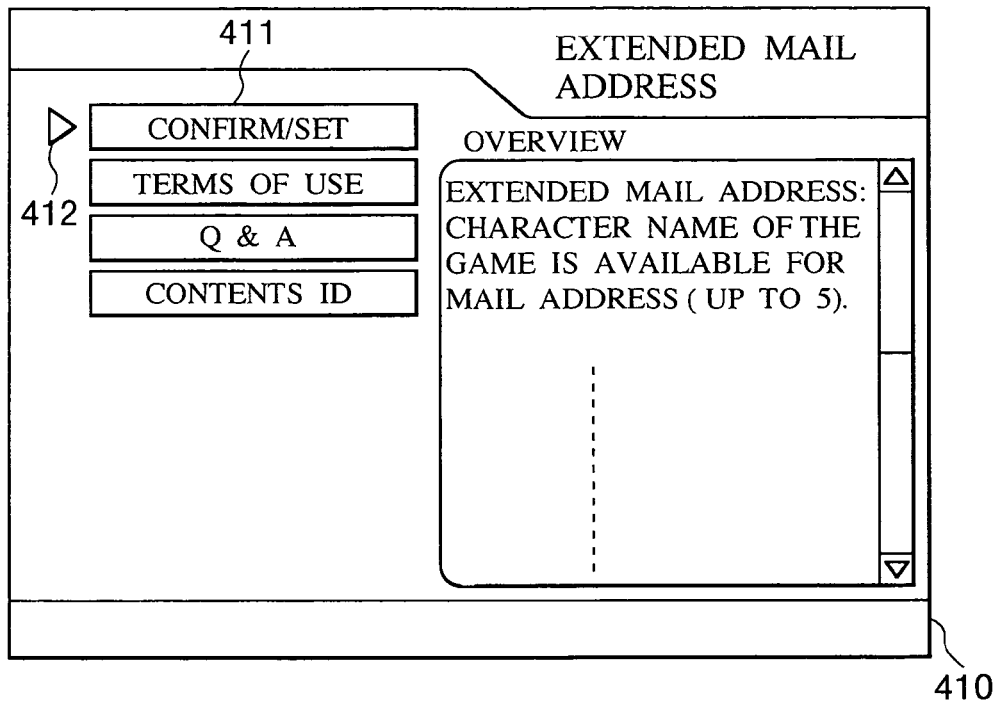
FIG. 5 is a view illustrating an extended mail address setting start screen according to an embodiment of the present invention.

In the case where the user sets the extended mail address, a menu screen (not shown) of the extension service is displayed on the display screen 122 of the terminal apparatus 1. When the user selects the setting of the extended mail address from the items included in the menu screen, an extended mail address setting start screen 410 shown in FIG. 5 is displayed as the display screen 122. When the user operates the directional key of the input section 161 to adjust a cursor 412 to a "confirm/set" button 411 on the extended mail address setting start screen 410, and further operates a predetermined button, an extended address setting request is sent to the mail server 22 from the terminal apparatus 1 via the management server 21.

Figure 6:
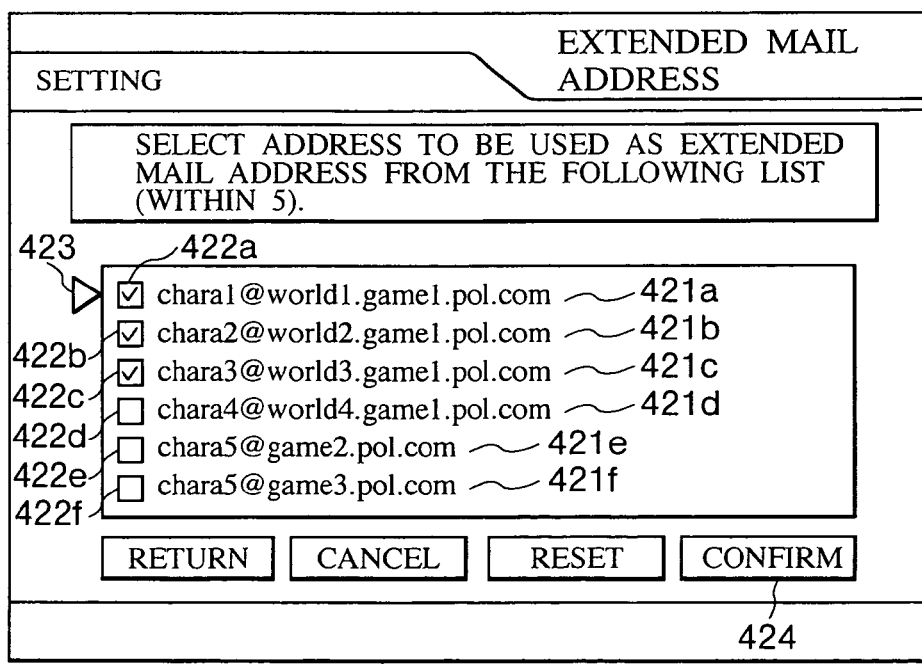
FIG. 6 is a view illustrating an extended mail address setting screen according to an embodiment of the present invention.

In response to this setting request, an extended mail address setting page, which is generated based on the extended mail address 305 set in the account information table 300 and the registration contents of the character information table 350, is sent back to the terminal apparatus 1. In the terminal apparatus 1, an extended mail address setting screen 420 shown in FIG. 6 is displayed as the display screen 122. On the extended mail address setting screen 420, candidate addresses 421a to 421f, which are available for an extended mail address, and corresponding checkboxes 422a to 422f are displayed. The candidate addresses 421a to 421f, which correspond to the checkmarked checkboxes 422a to 422f, are extended mail addresses that are set at this time.

The user operates the directional key of the input section 161 to move a cursor 423 to a desired candidate address among the candidate addresses 421a to 421f, and further operates a predetermined button to add/delete the checkmark to/from the checkbox 422, thereby making it possible to select an address to be used as an extended mail address. When the user operates the directional key to move the cursor 423 to a "confirm" button 424 and further operates a predetermined button, extended mail address setting is decided. The contents of the decided extended mail address setting are notified to the mail server 22 from the terminal apparatus 1.

Figure 7:
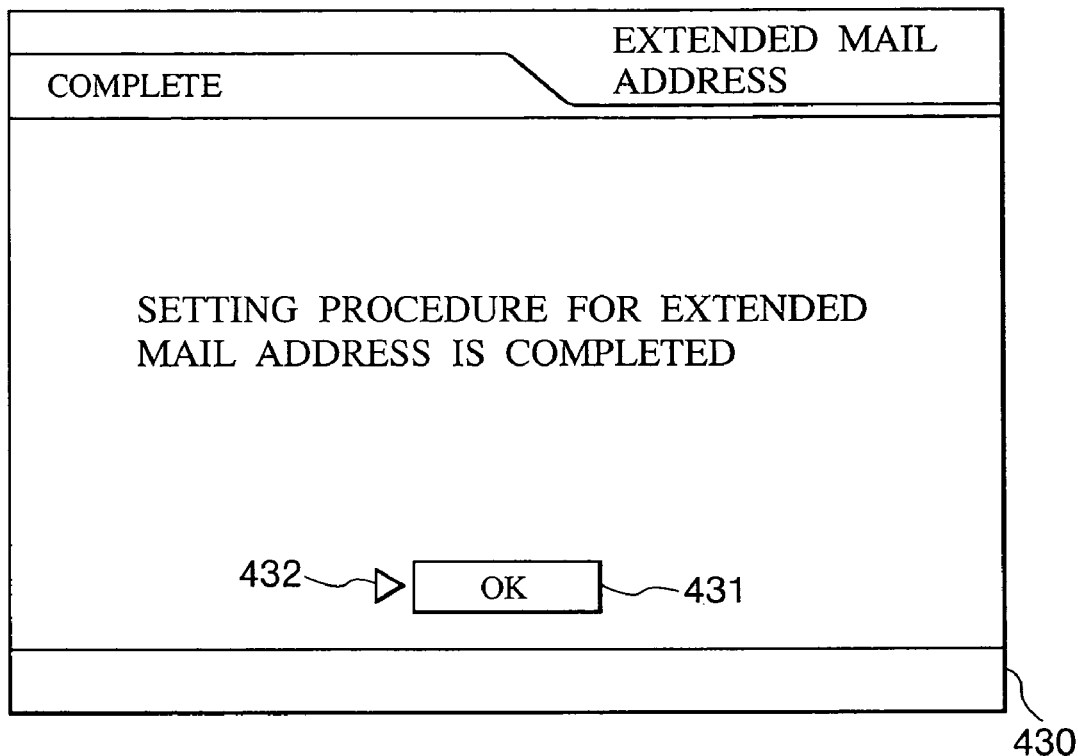
FIG. 7A is a view illustrating an extended mail address setting completion screen according to an embodiment of the present invention.
FIG. 7B is a view illustrating exemplary source code of an extended mail address setting completion page according to an embodiment of the present invention.

When the account information table 300 stored in each of the database server 24 and the mail server 22 is updated based on the notification of the contents of the extended mail address, a setting completion page of the extended mail address is sent back to the terminal apparatus 1. In the terminal apparatus 1, an extended mail address setting completion screen 430 shown in FIG. 7A is displayed as the display screen 122. The user can operate the directional key of the input section 161 to adjust a cursor 432 to an "OK" button 431 on the mail address setting completion screen 430. The setting completion page is described by markup language as illustrated in FIG. 7B, and a special control tag 433 of <meta control="GetmyMailAddr" is included therein.

The terminal apparatus 1 can recognize that the account information table 300 is updated in the database server 24 and the mail server 22 by recognizing the control tag 433. When recognizing the control tag 433 automatically, the terminal apparatus 1 requests the database server 24 to transmit account information via the mail server 22 in order to adjust its account information table 300 with the account information table 300 of the database server 24. Even if the other contents are the same as those of the setting completion page, it is not requested that account information should be transmitted to the database server 22 from the terminal apparatus 1 as long as no control tag 433 is included. If the control tag 433 is included, it is requested that account information should be transmitted to the database server 22 from the terminal apparatus 1 even if the other contents are different from the setting completion page.

The terminal apparatus 1 updates its account information table 300 stored based on the account information sent in response to the transmission request of account information. Processing for improving consistency among the account information tables 300, which are stored in the database server 24, the mail server 22, and the terminal apparatus 1 respectively, is also carried out when the terminal apparatus 1 logs into the service provided by the server group 2. Moreover, processing is periodically carried out at a time other than login time.

The mailbox is prepared in the mail server 22 not for each mail address but for each user. The mail server 22 does not have to prepare the mailbox for the extended mail address even if the extended mail address is set. When the mail is received, the mail server 22 extracts the user ID 301 registered in the account information table 300 corresponding to a destination address (standard mail address or extended mail address) of the relevant mail, and stores the relevant mail in the mailbox corresponding to the extracted user ID.

The user can voluntarily set the extended mail address at an arbitrary time. For this reason, at the time of replying to the mail received from the other user, the extended mail address, which was the received mail of a destination, has not been used in some cases. In the case where a return mail is generated in reply to the mail received from the other user in the terminal apparatus 1, a sender address of the return mail is set to any one of the mail addresses that are registered in the account information table 300 and currently available to the user (the mail address 302 or the extended mail address 305). A method in which a mail address in the account information table is selected as the sender address of the return mail will be described later.

The following explains processing in the network system to which the present embodiment is applied. Though the game server 23 of the server group 2 provides the service of the network game, processing of the game server 23 relating to the mail exchange service provided by the mail server 22 is explained. A character name, which is used in the network game by the user, can be used as a mail account for a mail address, so that setting, changing and deleting of the character name are processing relating to the mail exchange server.

When the user joins in a new network name, the user sets a character name in the game. The setting of the character name at the newly participating time can be executed by substantially the same processing as the changing of the character name. Actually, when a new user participates in the provided network game (or world), the game server 23 assigns an appropriate character name to the relevant user so that the character name may be used by default.

Figure 8:
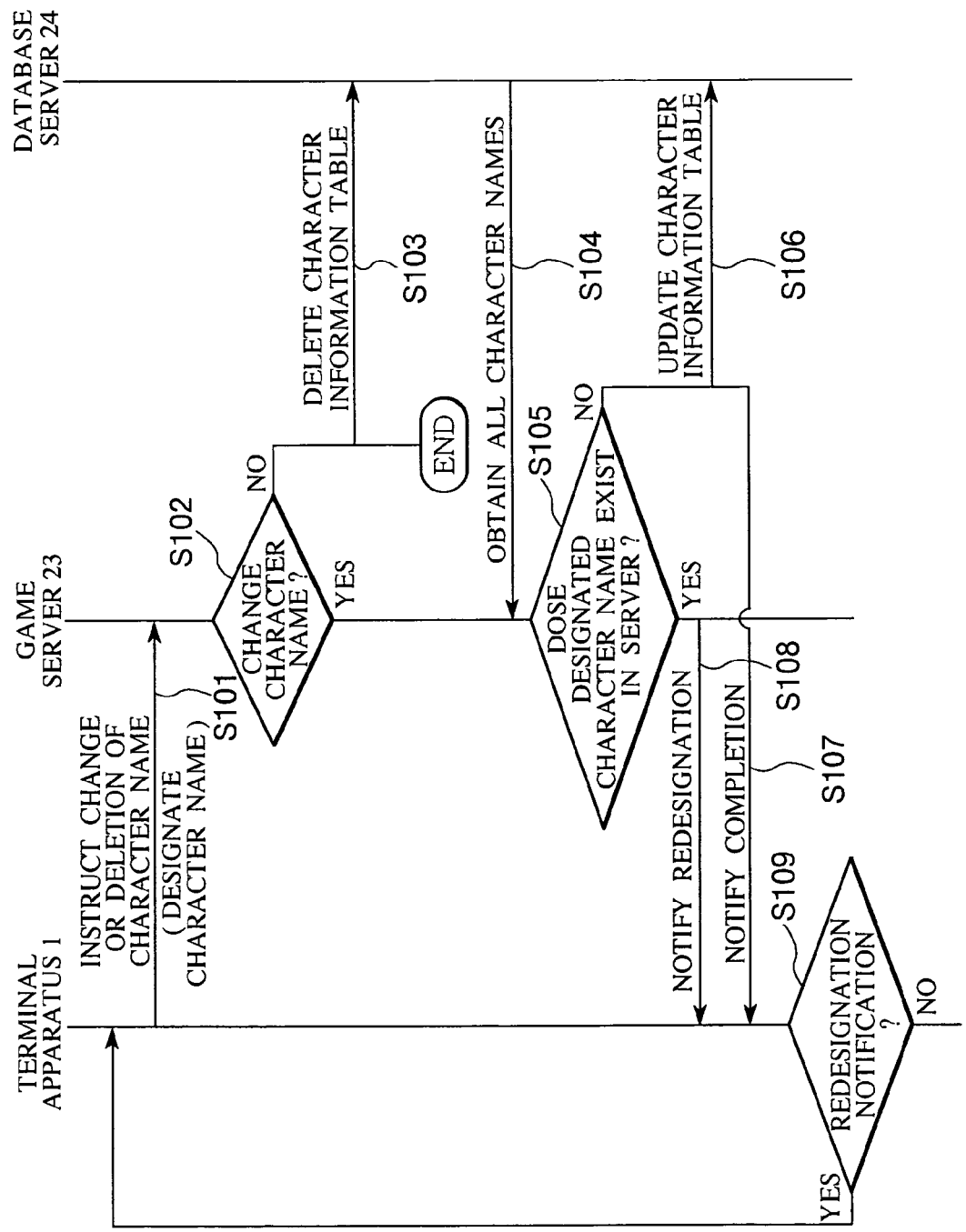
FIG. 8 is a flowchart illustrating change/deletion processing for a character name according to an embodiment of the present invention.

FIG. 8 is a flowchart illustrating change/delete processing of the character name according to the present embodiment. The change/delete processing of the character name is executed by the terminal apparatus 1, the game server 23, and the database server 24.

The user causes the terminal apparatus 1 to be connected to the game server 23, which provides the network game (world) using a character name to be changed or deleted. The user executes a predetermined input from the input section 161 according to the function of the network game provided by the game server 23, so that the character name is designated and the change of the character name or the deletion is designated. At the time of changing the character name, the user also designates the changed character name. The instruction to change or delete the character name is sent to the game server 23 via the Internet 3 from the communications interface 115 by the control section 103 (step S101). The terminal apparatus 1 waits for receipt of a notification from the game server 23.

When the game server 23 receives the instruction to change or delete the character name from the terminal apparatus 1, the CPU 201 determines whether the instruction is the deletion of the character name or the change of the character name (step S1102). When the instruction is the deletion of the character name, the CPU 201 requests the database server 24 to delete the character information table 350 having the designated character name in connection with the game server 23 via the LAN 25. The CPU 201 of the database server 24 deletes the corresponding character information table 350 based on this request (step S103). This ends the deletion of the character name.

When the instruction from the terminal apparatus 1 indicates a change of the character name, the CPU 201 of the game server 23 gains access to the database server 24 via the LAN 25, and sends a request for all registered character names in connection with the network game provided by the game server 23 to the database sever 24. The CPU 201 of the database server 24 obtains all character names registered in the character information table 350 in connection with the game server 23 based on this request, and sends back the obtained character names to the game server 23, which is a request source, via the LAN 25 (step S104).

The CPU 201 of the game server 23 compares the designated character name with each of the character names sent from the database server 24 sequentially, and determines whether there is the same character name in the network game provided by the game server 23 as the designated character name (step S105). When the same character name is not present, the CPU 201 requests the database server 24 to update the character name 353 of the character information table 350 via the LAN 35. The CPU 201 of the database server 24 updates the character name 353 registered in the corresponding character information table 350 to the designated character name based on this request (step S106).

When the update of character information table 350 is executed by the database server 24, the CPU 201 of the game server 23 sends back a completion notification to the terminal apparatus 1 via the Internet 3 (step S107). When there is the same character name in the network game provided by the game server 23 as the designated character name, the CPU 201 of the game server 23 sends back a redesignation notification to the terminal apparatus 1 via the Internet 3 (step S1108).

When the terminal apparatus 1, which has waited to receive the notification, receives the notification from the game server 23, the control section 103 determines whether the received notification is the redesignation notification (step S109). When the received notification is the redesignation notification, the control section 103 reexecutes processing from step S101. When the received notification is the completion notification, the change of the character name is completed. After changing the character name, the user can execute the network name using the changed character name.

The character name, which is used in the network game by the user, is available for a mail account of the mail address in the mail exchange service provided by the mail server 22. In this embodiment, the user must preset the use of the extension service in the mail exchange service in order to use the extended mail address including the character name as the mail account. The user can arbitrarily stop using the extension service.

Figure 9:
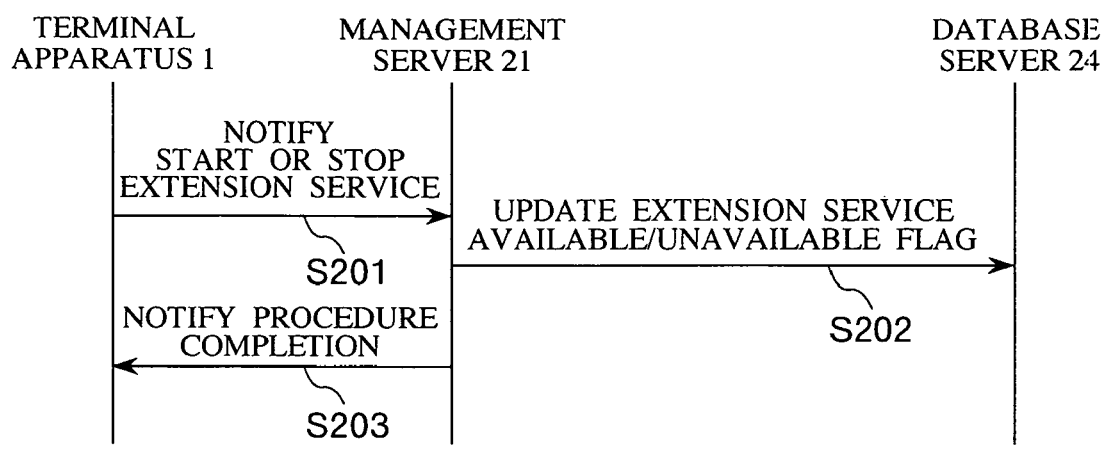
FIG. 9 is a flowchart illustrating extension service start/stop processing according to an embodiment of the present invention.

FIG. 9 is a flowchart illustrating extension service start/stop processing according to the present embodiment. The extension service start/stop processing is executed by the terminal apparatus 1, the management server 21 and the database server 24.

When the user executes a predetermined input from the input section 161 to instruct to start or stop using the extension service, the control section 103 of the terminal apparatus 1 causes the communications interface 115 to send an instruction notification of starting or stopping the use of the extension service to the management server 21 via the Internet 3 (step S201).

The CPU 201 of the management server 21 instructs the database server 24 to update the extension service available/unavailable flag via the LAN 25 based on the instruction notification of starting or stopping the use of the extension service from the terminal apparatus 1. The CPU 201 of the database server 24 sets (in the case of starting the use) or resets (in the case of stopping the use) the extension service available/unavailable flag 306 of the account information table 300 stored in the database server 24 in connection with the user (step S202).

When the extension service available/unavailable flag 306 is set or reset, the CPU 201 of the management server 21 transmits a procedure completion notification to the terminal apparatus 1 from the communications interface 205 via the Internet 3 (step S203). This ends the extension service start/stop processing.

The user can use the extended mail address using the character name as a mail account when the use of the extension service is set. According to the present embodiment, in order to use the extended mail address, the user must further set an extended mail address to be used. A new character name is used when the user changes the character name or joins in a new network game. The user can arbitrarily change the set extended mail address.

Figure 10:
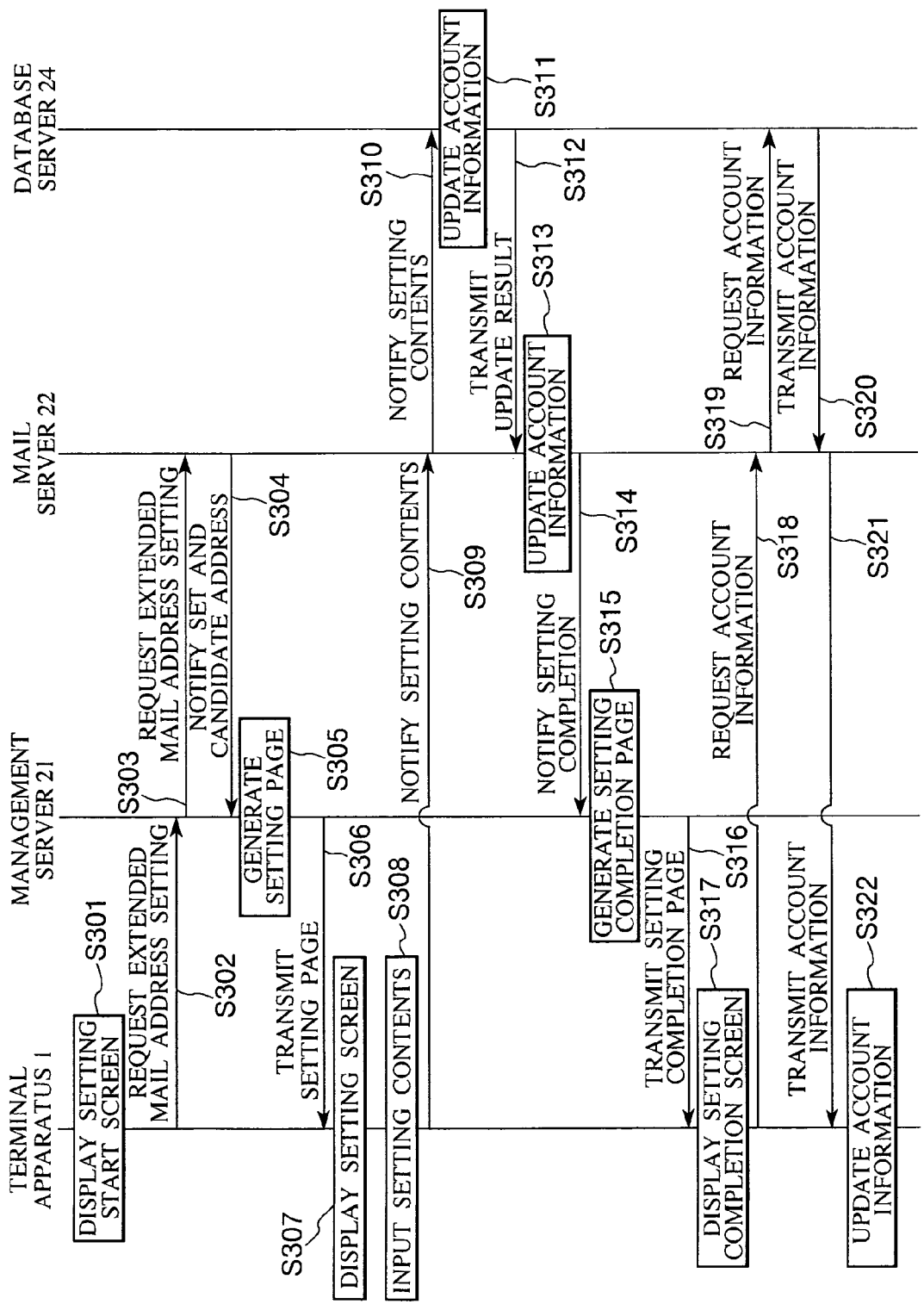
FIG. 10 is a flowchart illustrating extended mail address setting processing according to an embodiment of the present invention.

FIG. 10 is a flowchart illustrating extended mail address setting processing according to the present embodiment. The extended mail address setting processing is executed by the terminal apparatus 1, the management server 21, the mail server 22, and the database server 24.

The user operates the input section 161 in a state that a menu screen for extension service is displayed, so that an extended mail address is selected as service contents. When the control section 103 transmits a request for an extended mail setting start page to the management server 21, the extended mail setting start page is sent to the terminal apparatus 1 from the management server 21. The control section 103 causes the extended mail address setting start screen 410 shown in FIG. 5 to be displayed as the display screen 122 based on the setting start page (step S301).

On the displayed extended mail address setting start screen 420, the user operates the directional key of the input section 161 to move the cursor 412 to the "confirm/set" button 411, and further operates a predetermined button. The control section 103 causes the communications interface 115 to send an extended mail address setting request to the management server 21 via the Internet 3 (step S302). The management server 21 transfers the extended mail address setting request to the mail server 22 via the LAN 25 (step S303).

When receiving the extended mail address setting request, the CPU 201 of the mail server 22 obtains an extended mail address/addresses, which is currently set in the account information table 300 of the mail server 22 in connection with the user who made the above request. The CPU 121 obtains an extended mail address/addresses, which the user can set based on the character name registered in the character information table 350 of the mail server 22. The CPU 201 of the mail server 22 returns an extended mail address/addresses, which is currently set or settable, to the management server 21 from the communications interface 205 via the LAN 25 (step S304).

The CPU 201 of the management server 21 generates a setting page of the extended mail address based on the currently set or settable extended mail address returned from the mail server 22 (step S305). The CPU 201 transmits the setting page of the extended mail address to the terminal apparatus 1 of the request source from the communications interface 205 via the Internet 3 (step S306). In the terminal apparatus 1, the control section 103 causes the extended mail address setting screen 420 shown in FIG. 6 to be displayed as the display screen 122 (step S307).

On the extended mail address setting screen 420, the user selects an address/addresses, which is set as an extended mail address, from the candidate addresses 412*a* to 421*f* by the operation of the input section 161. In order to cancel the extended mail address, which is currently set, a checkmark may be deleted from the checkboxes 422*a* to 422*f* corresponding to the relevant addresses. In order to set a new extended mail address, a checkmark may be added to the checkboxes 422*a* to 422*f* corresponding to the relevant addresses (step S308).

On the displayed extended mail address setting start screen 420, the user operates the directional key of the input section 161 to move the cursor 423 to the "confirm" button 424, and further operates a predetermined button, the control section 103 causes the communications interface 115 to send the contents of the new extended mail address to the mail server 22 via the Internet 3 (step S309). The mail server 22 transfers the setting contents notification to the database server 24 via the LAN 25 (step S310).

When the setting contents of the extended mail address are notified from the mail server 22, the CPU 201 of the database 24 updates the extended mail address 305 of the account information table 300 stored internally according to the notified setting contents (step S311). When the account information table 300 is updated, the updated contents of the account information are transmitted to the mail server 22 from the database server 24 via the LAN 25 (step S312).

The CPU 201 of the mail server 22 updates the account information table 300 of the mail server 22 according to the updated contents of account information sent from the database server 24 (step S313). When the update of the account information table 300 is ended, the CPU 201 transmits an account information setting completion notification to the management server 21 from the communications interface 205 via the LAN 25 (step S314).

The CPU 201 of the management server 21 generates an extended mail address setting completion page based on the setting completion notification sent from the mail server 22 (step S315). The setting completion page is transmitted to the terminal apparatus 1 of a notification source from the communications interface 205 via the Internet 3 (step S316). In the terminal apparatus 1, the control section 103 causes the extended mail address setting completion screen 430 shown in FIG. 7A to be displayed as the display screen 122 based on the setting completion page sent from the management server 21 (step S317).

The setting completion page includes the control tag 433 as shown in FIG. 7B. When recognizing the control tag 433 on the page received from the management server 21, the control section 103 transmits an account information transmission request to the mail server 22 from the communications interface 115 via the Interface 3 (step S318). The mail server 22 transfers the account information transmission request to the database server 24 via the LAN 25 (step S319).

In response to the account information transmission request, the CPU 201 of the database server 24 reads account information registered in the account information table 300 in connection with the user and sends back the read account information to the mail server 22 (step S320). The CPU 201 of the mail server 22 transmits the account information sent from the database server 24 to the terminal apparatus 1 (step S321).

When receiving the account information sent from the database server 24 via the mail server 22, the control section 103 of the terminal apparatus 1 updates the account information table 300 stored internally according to the received account information (step S322). This ends the extended mail address setting processing. In the mail address setting processing, consistency between the account information table 300 in each of the database server 24, the mail server 22 and the terminal apparatus 1 is improved.

When the terminal apparatus 1 operated by the user is changed, the account information table 300 having correct contents is not stored in the newly used terminal apparatus 1. Even after the user stops using the extension service by using the new terminal apparatus 1, the extended mail address using the character name as the mail account is stored in the account information table 300 in the originally used terminal apparatus 1. Even if the user changes/deletes the character name using the new terminal apparatus 1, the extended mail address using the unused character name as the mail account is stored in the account information table 300 in the originally used terminal apparatus 1.

There is a possibility that the contents of the account information table 300 of the mail server 22 and the terminal apparatus 1 will be different from the original contents of the account information table 300 of the database server 24 for some reason. In order to make the account information table 300 of the terminal apparatus 1 completely consistent with the original account information table 300 of the database server 24, terminal login processing shown in FIG. 11 and account information change processing shown in FIG. 12 are executed.

Figure 11:
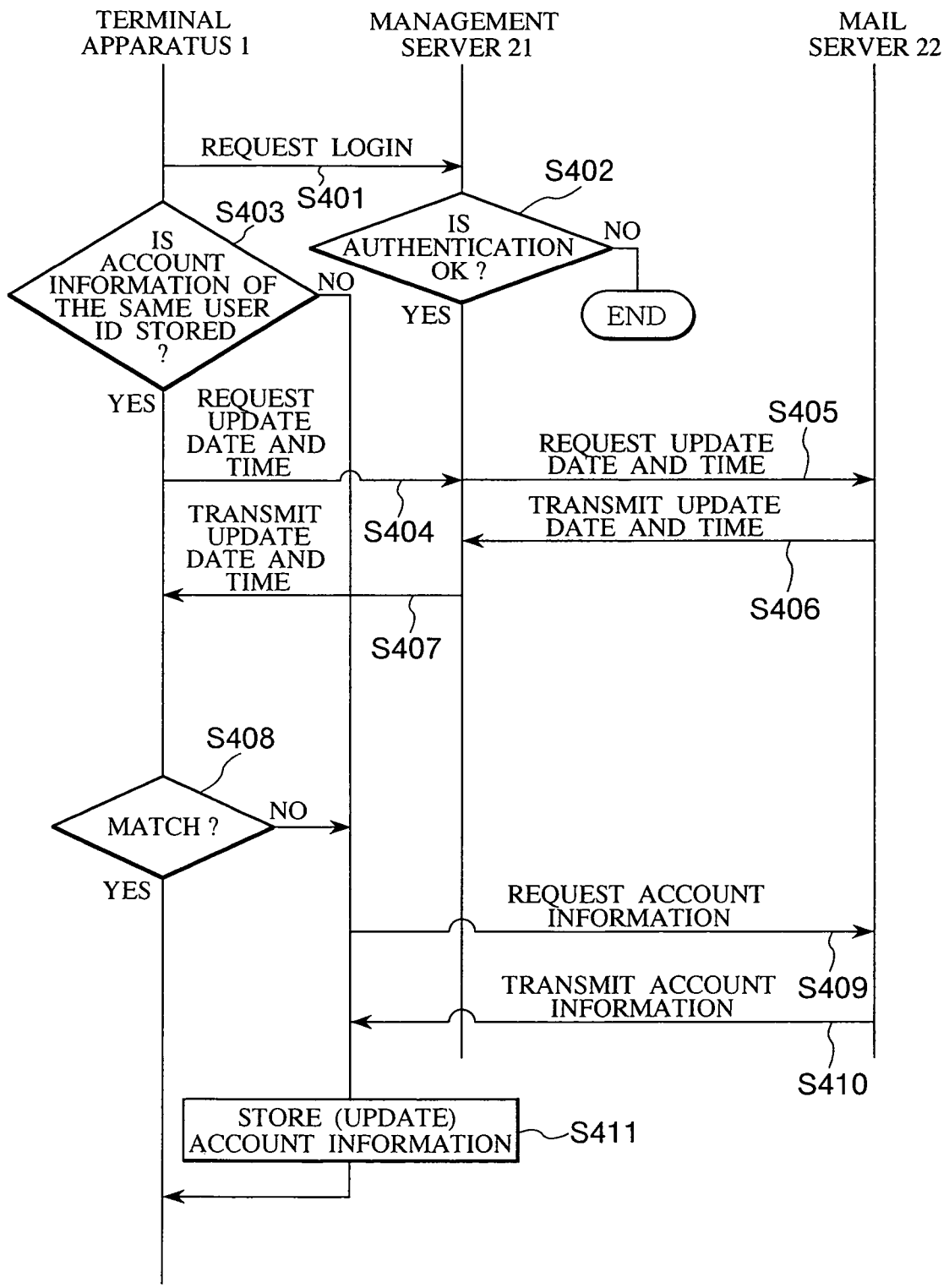
FIG. 11 is a flowchart illustrating terminal login processing according to an embodiment of the present invention.
Figure 12:
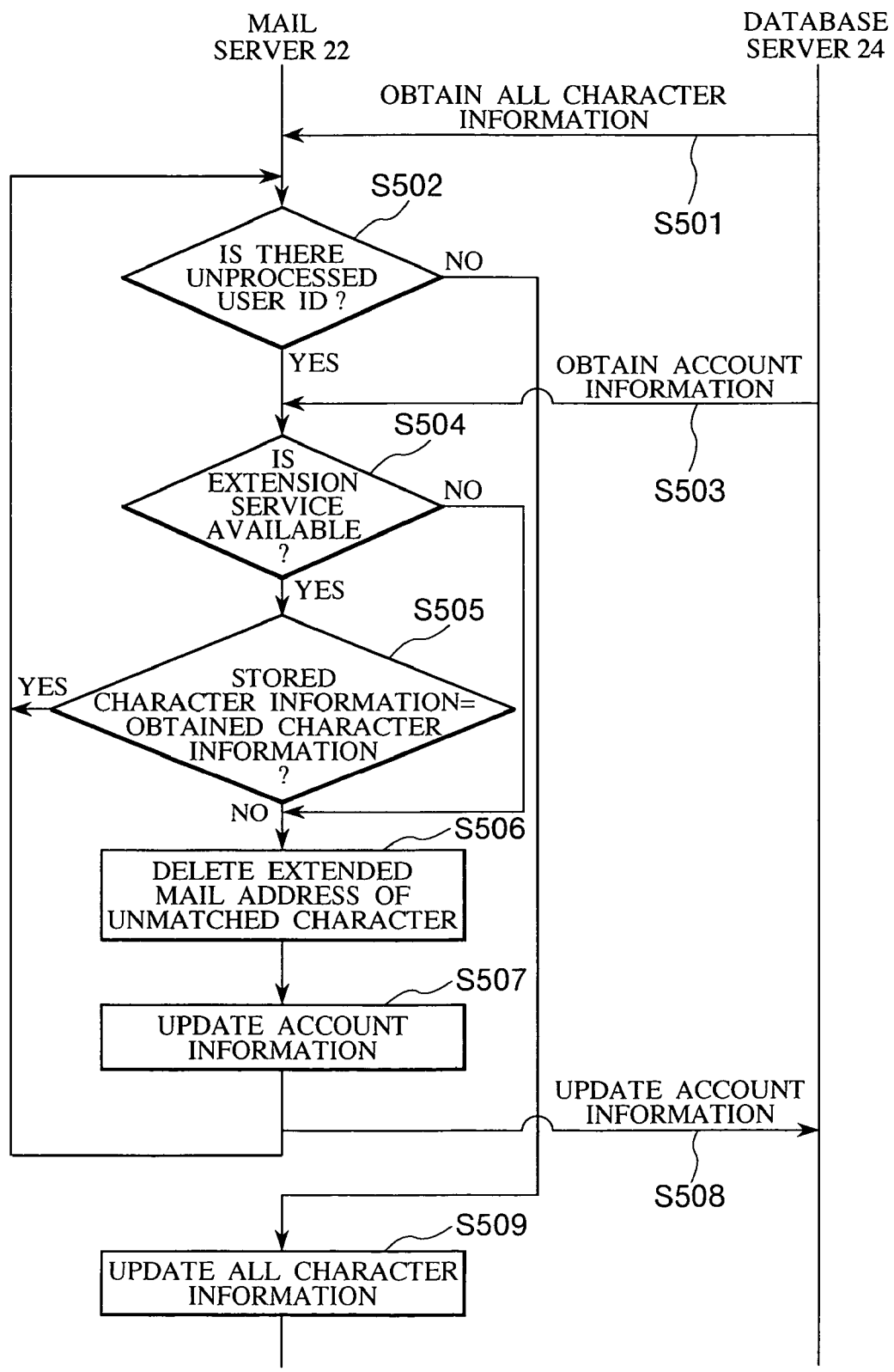
FIG. 12 is a flowchart illustrating account information update processing according to an embodiment of the present invention.

FIG. 11 is a flowchart illustrating terminal login processing according to the present embodiment. The terminal login processing is executed by the terminal apparatus 1, the management server 21, and the mail server 22. In the case where the user desires to use the service provided by the server group 2, it is necessary for the user to gain access to the management server 21 from the terminal apparatus 1 to receive user authentication. Processing in the management server 21 is needed as terminal login processing.

In the terminal apparatus 1, after operating the input section 161 to input a user ID and a password, the user inputs an instruction to log into the service provided by the server group 2. The control section 103 causes the communications interface 115 to send a login request to the service provided by the server group 2 together with the input user ID and password to the management server 21 via the Internet 3 (step S401).

The CPU 201 of the management server 21 checks the user ID and password sent together with the login request against the user ID and password managed internally to execute user authentication. The CPU 201 determines whether the user is authenticated depending on whether the same user ID and password as those sent together with the login request are checked (step S402). When the user is not authenticated, the login of the user is rejected and processing is ended.

When the user is authenticated, the control section 103 of the terminal apparatus 1 determines whether the user ID used for the login request is registered in the account information table 300 stored in the terminal apparatus 1 (step S403). When the user requests a login from a new terminal apparatus 1 or requests a login from a terminal apparatus 1 that is rented, the input user ID is not registered in the account information table 300 in the terminal apparatus 1 that has requested the login.

When the input user ID is registered in the account information table 300, the control section 103 requests the management server 21 to transmit a final update date and time registered in the account information table 300 of the mail server 22 (step S404). The management server 21 transfers the request to the mail server 22 (step S405). The management server 21 may also transfer the request to the database server 24.

The CPU 201 of the mail server 22 reads the final update date and time 311 registered in the account information table corresponding to the user ID based on the request from the management server 21, and sends back the read final update date and time to the management server 21 via the LAN 25 (step S406). The CPU 201 of the management server 21 transfers the final update date and time from the mail server 22 to the requesting terminal apparatus 1 via the Internet 3 (step S407).

The control section 103 of the terminal apparatus 1 compares the final update date and time received from the mail server 22 via the management server 21 with the final update date and time 311 registered in the account information table 300 internally. The control section 103 determines whether both final update dates and times match (step S408). For example, when the user changes/deletes the character name to update the account information tables 300 of the mail server 22 and the database 24 in processing of FIG. 12, both final update dates and times do not match.

When the input user ID is not registered in the account information table 300 or both final update dates and times do not match, the control section 103 of the terminal apparatus 1 requests the mail server 22 to transmit account information from the communications interface 115 via the Internet 3 (step S409). This request may also be sent to the database server 24. The CPU 201 of the mail server 22 reads all account information registered in the account information table 300 internally based on the request from the terminal apparatus 1, and sends back the read account information to the requesting terminal apparatus via the Internet 3 (step S410).

When receiving account information from the mail server 22, the control section 103 of the terminal apparatus 1 directly stores the received account information internally as the account information table 300. When the account information table 300 is stored in the terminal apparatus 1, the control section 103 updates the contents of the account information table 300 to the account information received from the mail server 22 (step S411). This ends the login processing, so that the user can use the service provided by the server group 2.

When the final update date and time sent from the mail server 22 match the final update date and time registered in the account information table 300, the login processing is ended, and the user can use the service provided by the server group 2.

FIG. 12 is a flowchart illustrating account information update processing according to the present embodiment. The account information update processing is executed in order to exclude extended mail addresses of the user, who stops using the extension service, and extended mail addresses including a character name no longer used as the mail account, and adjust the registration contents of the account information tables 300 of the mail server 22 and the database server 24. The account information update processing is executed on the occasion of timer interruption caused every predetermined period by an internal timer of the CPU 201 of the mail server 22. The account information update processing is executed by the mail server 22 and the database server 24.

The CPU 201 of the mail server 22 sends a predetermined instruction to the database server 24 via the LAN 25 to obtain all character information tables 350 stored in the database server 24. The CPU 201 temporarily stores the character information tables obtained from the database server 24 in a working area of, for example, an HDD 207 (step S501). In order to make a distinction between the character information table obtained from the data base server 24 and the character information table 350 originally stored in the mail server 22, the table originally stored in the mail server 22 is called stored character information and the table obtained from the database server 25 is called obtained character information.

The CPU 201 of the mail server 22 uses each of the user IDs (either the user IDs included in the stored character information or the user IDs included in the obtained character information) as an object to be sequentially processed. The CPU 201 determines whether there is a user ID that has not yet been processed (step S502). When there is a user ID that has not yet been processed, the CPU 201 sends a predetermined instruction to the database server 24 together with the relevant user ID via the LAN 25 to obtain account information stored in the account information table 300 corresponding to the user ID from the database server 24. The CPU 201 of the mail server 22 temporarily stores the account information obtained from the database server 24 to the RAM 203 (step S503).

The CPU 201 of the mail server 22 determines whether the extension service available/unavailable flag 306 of the account information obtained from the database server 24 is set, namely whether the user corresponding to the user ID to be processed uses the extension service (step S504). When the extension service available/unavailable flag 306 is set, the stored character information corresponding to the user ID and the obtained character information are compared with each other to determine whether they both match each other (step S505). When they both match each other, the processing flow goes back to step S502.

When the stored character information corresponding to the user ID does not mach the obtained character information, the CPU 201 of the mail server 22 deletes the extended mail address corresponding to character information not matching any of the extended mail addresses temporarily stored in the RAM 203. When the extension service available/unavailable flag 306 is reset in step S504, the CPU 201 of the mail server 22 deletes all extended mail addresses corresponding to the user IDs being processed from account information temporarily stored in the RAM 203 (step S506).

The CPU 201 of the mail server 22 updates the registration contents of the account information tables 300 of the mail server 22 to the account information temporarily stored in the RAM 203 (step S507). The CPU 201 sends back the account information temporarily stored in the RAM 203 to the database server 24 via the LAN 25 to update the contents of the account information table 300 stored in the database server 24 (step S508).

After the update of the account information tables 300 of all user IDs (step S502), the CPU 201 of the mail server 22 stores the obtained character information in the character information table 350 in place of the stored character information (step S509). This ends the account information update processing.

In the mail exchange service provided by the mail server 22, the user can transmit and receive the mail using the set extended mail address or the standard mail address given to each user regardless of the use of the expansion service. The mail server 22 stores the mail obtained via the Internet 3 in a suitable mailbox. The terminal apparatus 1 obtains the mail stored in the mailbox of the mail server 22 and displays the obtained mail on the display device 121.

Figure 13:
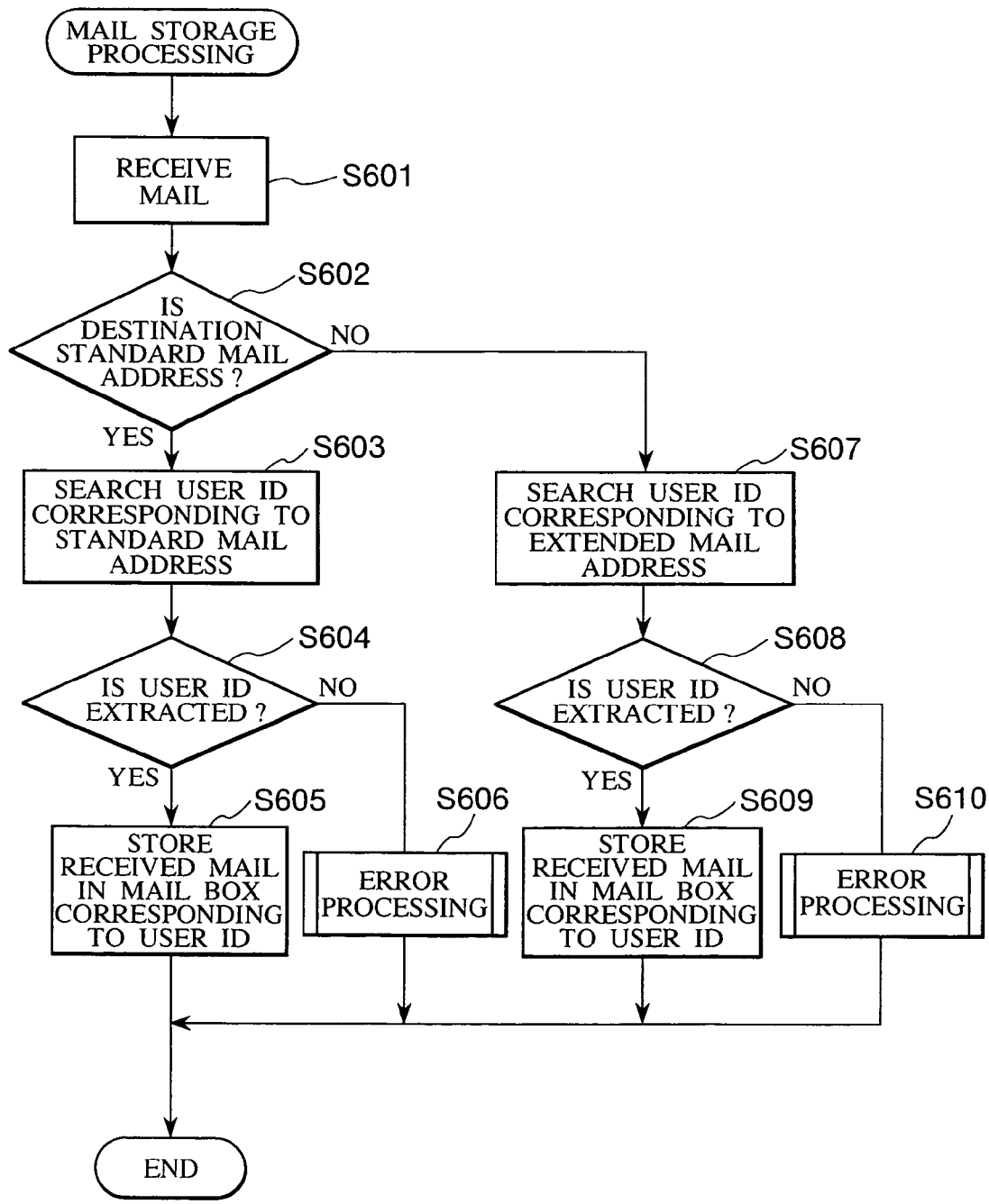
FIG. 13 is a flowchart illustrating mail storage processing according to an embodiment of the present invention.

FIG. 13 is a flowchart illustrating mail storage processing according to the present embodiment. The mail storage processing is executed to store the mail obtained from the Internet 3 in the mailbox according to a destination address of the mail. The mail storage processing is executed by only the mail server 22.

When the communications interface 205 receives the mail sent from the Internet 3, the CPU 201 of the mail server 22 temporarily stores the received mail to a predetermined area of the RAM 203 (step S601). The CPU 201 checks a domain (portion after @ in the mail address) of the destination address of the received mail and determines whether the destination address is the standard mail address (step S602).

When the destination address is the standard mail address, the CPU 201 checks the account information table 300 stored in the mail server 22 to search a user ID corresponding to the standard mail address (step S603). The CPU 201 determines whether the user ID is extracted as a result of the search (step S604). When the user ID is extracted, the CPU 201 stores the received mail in the mailbox corresponding to the user ID (step S605). Then, the mail storage processing is ended. When the user ID is not extracted, the CPU 201 executes a predetermined error processing (the same as the conventional processing) (step S606). Then, the mail storage processing is ended.

When the destination address is the extended mail address, the CPU 201 checks the account information table 300 stored in the mail server 22 to search a user ID corresponding to the extended mail address (step S607). The CPU 201 determines whether the user ID is extracted as a result of the search (step S608). When the user ID is extracted, the CPU 201 stores the received mail in the mailbox corresponding to the user ID (step S609). Then, the mail storage processing is ended. When the user ID is not extracted, the CPU 201 executes a predetermined error processing (the same as the conventional processing) (step S610). Then, the mail storage processing is ended.

When the number of destination addresses of the received mail is multiple, the CPU 201 executes processing in steps S602 to S610 in connection with each destination address. When the number of mail addresses of the same user as that of the destination address of the received mail is multiple, the same user ID is searched from a different mail address. In this case, mails for each mail address may be stored in the mailbox or only one mail in connection with the user ID may be stored in the mailbox.

Figure 14:
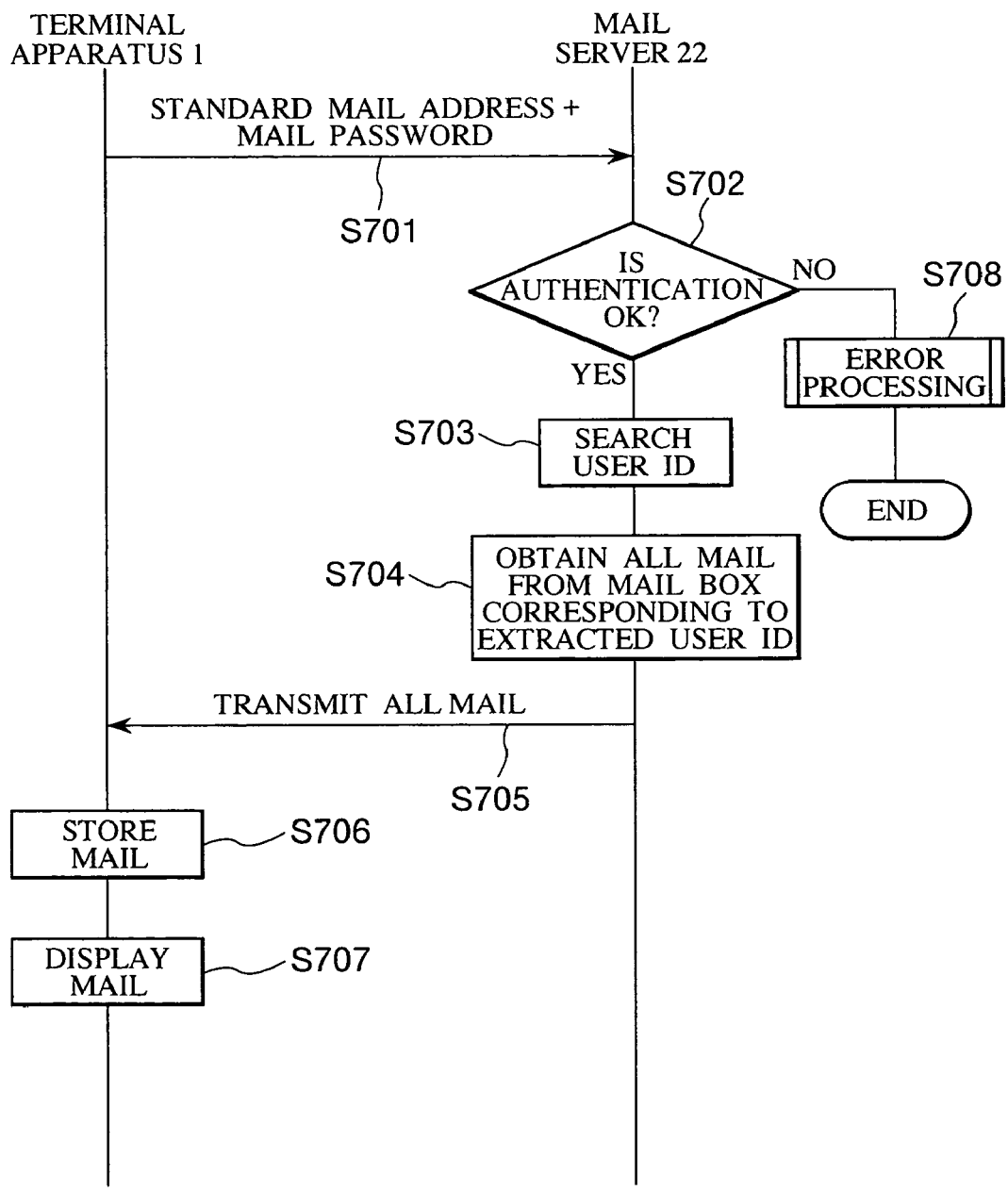
FIG. 14 is a flowchart illustrating mail obtaining processing according to an embodiment of the present invention.

FIG. 14 is a flowchart illustrating mail obtaining processing according to the present embodiment. The mail obtaining processing is executed by the terminal apparatus 1 and the mail server 22.

When the user operates the input section 161 to instruct reception of mail in the terminal apparatus 1, the control section 103 obtains the standard mail address 303 and the mail password 304 that are stored in the account information table 300 of the terminal apparatus 1. The control section 103 transmits a mail reception request together with the obtained standard mail address and mail password to the mail server 22 from the communications interface 115 via the Internet 3 (step S701).

When the communications interface 205 receives the mail reception request from the terminal apparatus 1, the CPU 201 of the mail server 22 checks the mail address and mail password sent together with the reception request against the standard mail address 303 and the mail password 304 that are stored in the account information table 300 of the mail server 22. The CPU 201 determines whether the mail reception request is authenticated (step S702).

When the mail reception request is authenticated, the CPU 201 searches the user ID 301 registered in the account information table 300 that is associated with the standard mail address, and extracts the searched user ID (step S703). The CPU 201 obtains all mail stored in the mailbox corresponding to the extracted user ID (step S704). The CPU 201 causes the communications interface 205 to send all obtained mail to the terminal apparatus 1 as the request source via the Internet 3 (step S705).

When the communications interface 115 receives the mail sent from the mail server 22, the control section 103 of the terminal apparatus 1 stores the received mail in a predetermined area of, for example, HDD 107 (step S706). The control section 103 causes the received mail to be displayed on the display device 121 in cooperation with the graphics processing section 111 (step S707). Then, the mail obtaining processing is ended. When the mail reception request is not authenticated in step S702, the CPU 201 of the mail server 22 executes a predetermined error processing (the same as the conventional processing) (step S708). In this case, no mail is transmitted to the terminal apparatus 1. Then, the mail obtaining processing is ended.

The user obtains a mail when his/her standard mail address or extended mail address is designated as a destination address as mentioned above. As a matter of fact, when replying to a mail where the extended mail address is used as the destination address, there is a possibility that the extended mail address is no longer been used depending on whether the extension service is stopped or the extended mail address to be used has been changed. When the extended mail address is no longer used, there occurs trouble in which the user cannot receive a return mail generated by another user, who received the return mail. In the present embodiment, the sender address of the return mail is set to avoid such trouble.

Figure 15:
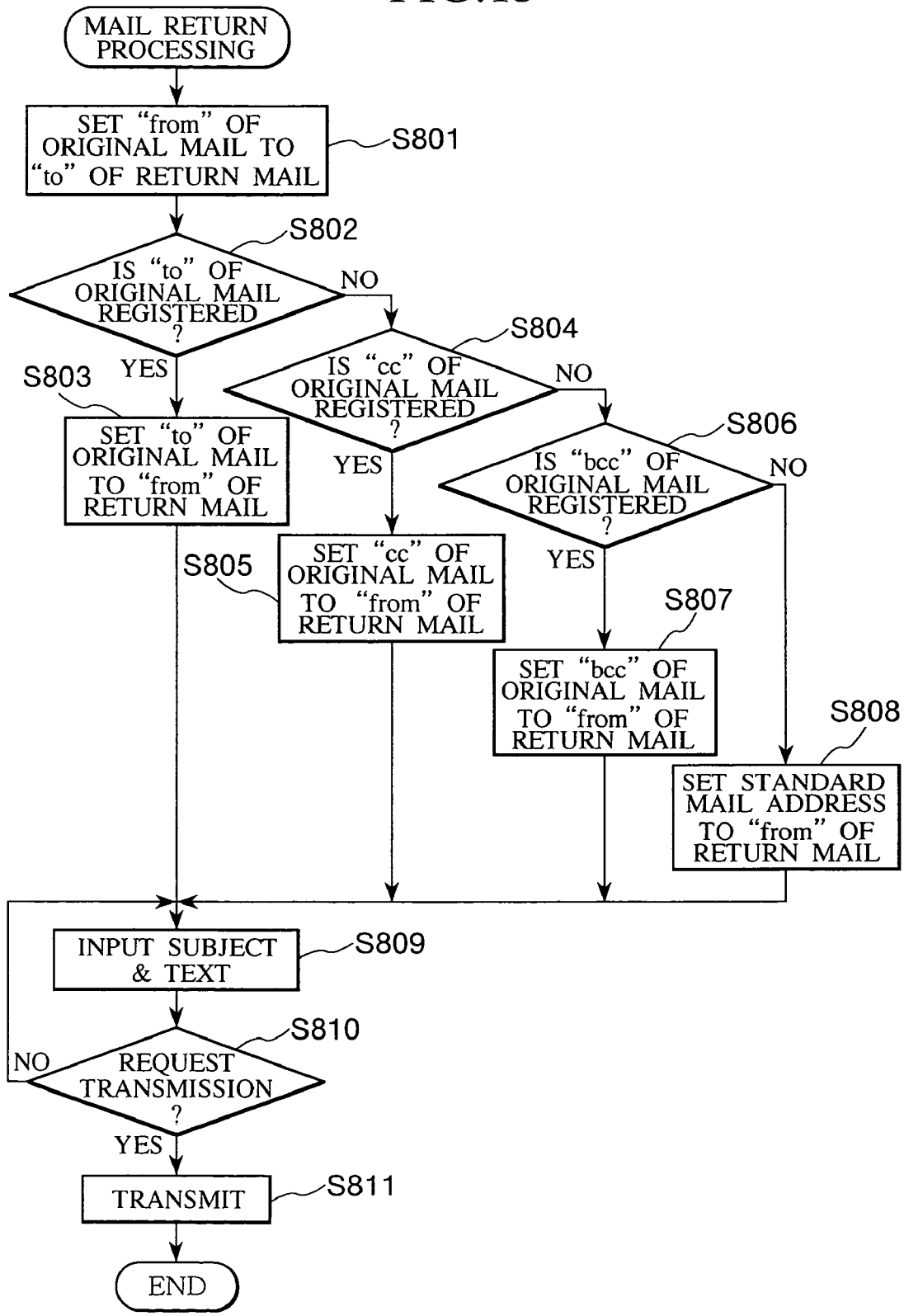
FIG. 15 is a flowchart illustrating mail return processing according to an embodiment of the present invention.

FIG. 15 is a flowchart illustrating mail return processing according to the present embodiment. The mail return processing is processing that is executed when the user instructs to generate a return mail in reply to a mail received by the terminal apparatus 1. Return mail generation processing is executed by only the terminal apparatus 1. In the explanation given below, it is assumed that a previously received mail as a return mail from another terminal apparatus 1 is called an original mail.

When instructed to generate a return mail in reply to the original mail, the control section 103 sets the mail address, which is set to the sender "from" of the original mail, to a destination "to" of the return mail (step S801). The control section 103 determines whether the mail address, which is set to the destination "to" of the original mail, is registered as the extended mail address 305 in the account information table 300 of the terminal apparatus 1 (step S802). When the mail address is registered as the extended mail address 305, the control section 103 sets the mail address, which is set to the destination "to" of the original mail, to the sender "from" of the return mail (step S803), and then the processing flow proceeds to step S809.

When the mail address, which is set to the destination "to" of the original mail, is not registered as the extended mail address 305, the control section 103 determines whether the mail address, which is set to the destination "cc" of the original mail, is registered as the extended mail address 305 in the account information table 300 of the terminal apparatus 1 (step S804). When the mail address is registered as the extended mail address 305, the control section 103 sets the mail address, which is set to the destination "cc" of the original mail, to the sender "from" of the return mail (step S805), and then the processing flow proceeds to step S809. When there is no "cc" as the destination of the original mail, the mail address is determined as not being registered as the extended mail address 305.

When the mail address, which is set to the destination "cc" of the original mail, is not registered as the extended mail address 305, the control section 103 determines whether the mail address, which is set to the destination "bcc" of the original mail, is registered as the extended mail address 305 in the account information table 300 of the terminal apparatus 1 (step S806). When the mail address is registered as the extended mail address 305, the control section 103 sets the mail address, which is set to the destination "bcc" of the original mail, to the sender "from" of the return mail (step S807), and then the processing flow proceeds to step S809. When there is no "bcc" as the destination of the original mail, the mail address is determined as not being registered as the extended mail address 305.

When the mail address, which is set to the destination "bcc" of the original mail, is not registered as the extended mail address 305, the control section 103 sets the standard mail address 303, which is registered in the account information table 300 of the terminal apparatus 1, to the sender "from" of the return mail (step S808), and then the processing flow proceeds to step S809.

In step S809, the control section 103 sets the subject of the return mail to "RE: (the subject of the original mail)" and the user operates the input section 161 to input the text of the mail. The user may change the subject with input from the input section 161. The control section 103 determines whether transmission of the return mail is requested by the input from the input section 161 (step S810). Until the transmission of the return mail is requested, the control section 103 repeats processing in step S809 and S810. When the transmission of the return mail is requested, the control section 103 causes the communications interface 115 to send the return mail via the Internet 3 (step S811). Then, the mail return processing is ended.

As explained above, in the server group 2 of the network system according to the present embodiment, the game server 23 provides the service of the network game, and the mail server 22 provides the mail exchange service. In the network game provided by the game server 23, the user sets the character name used in the game, and progresses the game using the character name set by the user himself/herself.

The character name used in the network game by the user is stored in the character information table 350. The user can use the extended mail address including the character name registered in the character information table 350 by the use of the extension service. In the network game, each user recognizes another user by the character name in many cases. The user, who joins in the network game provided by the game server 23, uses the extended mail address including the character name to make it possible to smoothly communicate with other users.

The extended mail address includes the character name as a mail account (front side of @) and the game name of the network game (and the world name) as a domain (back side of @). The extended mail address user clarifies the character name used in the network game and further clarifies in which game the relevant character name is used. Even if the same character name is used in the different game (or in different world of the same game) by a different user, the respective extended mail addresses can be distinguished by the game name (and world name) included in the domain.

The user can grasp an address, which may be an extended mail address of another user, based on the character name used in the network game. The user can grasp another user, who sent the mail, even when he/she receives the mail where the extended mail address is set to the sender address.

According to the present embodiment, the mailbox for storing the mail addressed to each user is provided for each of the user IDs. In the mail server 22, the mail using the extended mail address as the destination is stored in the mailbox provided to be associated with the user ID corresponding to each mail address as well as the mail using the standard mail address as the destination. The user can receive the mail using the extended mail address as the destination, similar to the mail using the standard mail address as the destination. Accordingly, the user can easily execute the mail exchange by the mail address including the character name used in the network game by himself/herself. Even in the mail server 22, the mails with the same destination can be sent at one time based on the request from the user, making it possible to facilitate processing for sending the mails stored in the mailbox to the terminal apparatus 1.

In the case where the user changes/deletes the character name used in the network game, the change is immediately reflected in the character information table 350 of the database server 24. The mail server 22 obtains the character information table 350 from the database server 24 for each predetermined time to update the contents of the internal character information table 350 and delete the extended mail address including the unused character name from the account information table 300. This eliminates the constant use of character names not used in the network game as the extended mail address.

The circumstances in the latest network game are reflected on the account information table 300 and character information table 350 of the mail server 22 as much as possible. Accordingly, when the user sets the character name used in the network game by the user himself/herself, he/she can use the extended mail address including the character name with fast timing.

The character information table 350 is also stored in the mail server 22. Accordingly, when the user sets the extended mail address, the character name used in the network game by the user can be easily obtained to make it possible to easily generate the extended mail address.

The contents of the character information table 350 of the mail server 22 are updated for each predetermined time. The extended mail address including the unused character name is deleted from the account information table 300 of the database server 24. At this time, the account information table 300 of the mail server 22 is updated to the same contents as that of the database server 24. This makes it possible to adjust the registration contents of the account information table 300 of the mail server 22 to the registration contents of the account information table 300 of the database server 24.

When the user sets the extended mail address, the set extended mail address is sent to the database server 24, so that the account information table 300 of the database server 24 is updated. The account information table 300 of the mail server 22 is updated by notifying an update result of the account information table 300 of the database server 24. This makes it possible to adjust the registration contents of the account information table 300 of the mail server 22 to the registration contents of the account information table 300 of the database server 24.

The terminal apparatus 1 sends a request for account information to the database server 24 via the mail server 22 by recognizing the control tag 433 included in the setting completion page 430. The account information table 300 of the terminal apparatus 1 is updated according to the account information sent from the database server 24 in response to the request. This makes it possible to adjust the registration contents of the account information table 300 of the terminal apparatus 1 to the registration contents of the account information table 300 of the database server 24.

When the user intends to log into the service provided by the server group 2 from the terminal apparatus 1, it is determined whether the same user ID as the user ID input by the user is registered in the account information table 300 of the terminal apparatus 1. It is determined whether the final update date and time 311 obtained from the account information table 300 of the database 24 is the same as the final update date and time 311 registered in the account information table 300 of the terminal apparatus 1.

When the user ID and the final update date and time 311 are the same, the account information table 300 stored in the terminal apparatus 1 is directly used to make it possible to use the mail exchange service provided by the mail server 22. In this case, there is no need to transmit information other than the final update date and time 311 to the terminal apparatus 1 from the mail server 22 via the Internet 3, so that a load applied to these sources can be reduced.

When the user ID or the final update and time 311 is different, the account information registered in the account information table 300 of the database server 24 is sent to the terminal apparatus 1 and stored in the terminal apparatus in place of the former stored account information table 300. This makes it possible to adjust the registration contents of the account information table 300 of the terminal apparatus 1 to the registration contents of the account information table 300 of the database server 24.

Even when the user logs into the service provided by the server group 2 from a new terminal apparatus 1 such as another user's terminal apparatus 1, the registration contents of the account information table 300 of the terminal apparatus 1 is rewritten to the original registration contents of the database server 24. For this reason, there is no need to set account information in the new terminal apparatus 1. Even when the account information table of the terminal apparatus 1 is corrupted, the user does not have to newly set account information. When the character name in the network game is changed/deleted, the account information tables 300 of the database server 24 and the mail server 22 are updated. Even in this case, the user does not have to newly set account information.

In addition, when the account information table 300 is not stored in the terminal apparatus 1, the final update date and time 311 in the terminal apparatus do not match with that obtained from the mail server 22 even though the account information table 300 is stored in the terminal apparatus 1, the registration contents of the account information table 300 of the terminal apparatus 1 are rewritten to the original registration contents of the database server 24. Accordingly, there is no case in which the unavailable extended mail address stays registered in the account information table 300 of the terminal apparatus 1. This makes it possible to prevent the unavailable extended mail address from being set to the sender address of the mail.

In the account information table 300 stored in the terminal apparatus 1, account information obtained from the server group 2 via the Internet 3 is automatically registered. For this reason, account information can be easily set to the terminal apparatus 1 even if the user does not execute the setting operation. Since account information is automatically registered in the account information table 300 of the terminal apparatus 1, the user can use the mail exchange service, which the mail server 22 provides, from an arbitrary terminal apparatus 1.

The account information table 300 registers the server name 307, the POP server port number 308, the SMTP server name 309 and the SMTP server port number 310. These information items are also automatically updated. Accordingly, even if the server name 307, the POP server port number 308, the SMTP server name 309 and/or the SMTP server port number 310 are changed in the server group 2, the user can use the mail exchange service provided by the mail server 22 without being aware of the change.

The standard mail address is indispensable for the user to use the mail exchange service provided by the mail server 22. However, the extended mail address is one that is used by the user setting and is not indispensable. The extended mail address cannot be used when the user stops using the extension service or changes/deletes the character name in the network game. Accordingly, when the user receives the mail (original mail) using the extended mail address as the destination in the terminal apparatus 1 and intends to generate a return mail in reply to the original mail, there is a possibility that the extended mail address will not be used.

In the terminal apparatus 1 according to the present embodiment, when the destination address of the original mail has already been unavailable, a currently available mail address is set as a sender address of a return mail from the other mail address registered in the account information table 300 of the terminal apparatus 1. For this reason, there is no case in which the unavailable mail address is set as the sender address of the return mail. If the destination address of the original mail is currently available, this address is set as the sender address of the return mail, so that the other user, who received the return mail, can easily determine to which mail the return mail responds.

In connection with the selection of the sender address in the return mail, priority is given to "to", "cc", and "bcc" as a destination address in the original mail in the order of designation. When the general user transmits a mail to another user, "to", "cc", and "bcc" are designated in descending order of importance as a transmission partner. Accordingly, the mail address is set to the sender address of the return mail based on such a priority order, so that the mail address, which is considered as a high importance by the user, who transmitted the mail as a return mail generation object, can be set to the sender address of the return mail.

When the destination address designated to any one of "to", "cc", and "bcc" is also unavailable, the standard mail address is set as the sender address of the return mail. Since the standard mail address is an essential mail address, it is possible to set a suitable mail address as the sender address of the return mail. Since the mail address to be set as the sender address of the return mail is only one that is currently used by the user, the return mail generated in reply to the return mail (original mail) by the other user is surely sent to the user.

The present invention is not limited to the aforementioned embodiment and various modifications and applications may be possible. The following explains some modifications of the aforementioned embodiment to which the present invention can be applied.

In the aforementioned embodiment, the account information update processing was executed by the timer interruption of the mail server 22 to delete the extended mail address that was unavailable due to the change/delete of the character name. In contrast to this, after character name change/delete processing in FIG. 8 is executed, the game server 23 may send the deleted character name (including one that is deleted by the change) to the database server 24, and the database server 24 may delete the extended mail address including the deleted character name from the account information table 300. At this time, even when the account information table 300 is updated, the mail server 22 can transmit account information to the terminal apparatus 1 to update the account information table 300 of the terminal apparatus 1.

In the aforementioned embodiment, regarding the extended mail address including the character name used in the network game by the user as the mail account, it was possible for only the user, who used the extension service of all services provided by the server group 2, to register 5 extended mail addresses at the maximum. However, all users, who use the service provided by the server group 2, may use the extended mail address regardless of whether the extension service is used. The number of extended mail addresses, which one user can use, can be more than one arbitrary number up to the number of character names used by the user at the maximum.

The user may use the extended mail address including the character name and the game name (world name) by setting the character name in the network game. In this case, when the character name is set (including one that is newly set by the change), the game server 23 may send the set character name to the database server 24 and the database server 24 may register the extended mail address including the newly set character name to the account information table 300. Moreover, at this time, even when the account information table 300 is updated, the mail server 22 transmits account information to the terminal apparatus 1, so that the account information table 300 of the terminal apparatus 1 can be also updated.

In the aforementioned embodiment, it was possible for the user to use the extended mail address including the character name used in the network game in addition to the standard mail address. For authentication at the time of reading the mail from the mailbox, the standard mail address was used. As a matter of fact, if authentication is executed using information (for example, user ID) other than the mail address, no standard mail address may be possible. This is because the mail server 22 may search a user ID corresponding to the extended mail address from the account information table 300 and store the mail in the mailbox corresponding to the user ID.

In the aforementioned embodiment, the mailbox was provided in the mail server 22 to be associated with the user ID. The mail using the mail address corresponding to the same user ID as the destination was stored in the same mailbox regardless of whether the mail address as the destination is the standard mail address or the extended mail address. However, the mailbox may be provided for each mail address. The mailbox is provided to be associated with the user ID and the network game (or world), and the mail corresponding to the game can be stored to the same mailbox even if the character name is changed. In the case where the mailbox is provided for each mail address (including the case in which the mailbox is prepared to be associated with the user ID and the network game (or world)), the terminal apparatus 1 may receive the mail from the respective mailboxes corresponding to the multiple mail addresses of the user.

In the aforementioned embodiment, the mail using the extended mail as the destination was stored in the mailbox managed by the mail server 22. However, the present invention is not limited to this. For example, the mail using the extended mail as the destination may be stored in the mailbox managed by another server different from the mail server 22. In this case, for instance, the mail server 22 may manage the mail address corresponding to the mailbox of the other server to transfer the mail using the extended mail as the destination to the other server. Moreover, in the case where the mail using the extended mail as the destination is stored in the mailbox of the other server, the terminal apparatus 1 can receive the mail stored in the mailbox of the other server from the corresponding other server.

In the aforementioned embodiment, when logging into the service provided by the server group 2, the terminal apparatus 1 obtained the final update date and time 311 registered in the account information table 300 of the mail server 22 and compared the obtained final update date and time with the final update date and time 311 registered in the internal account information table 300. When there was no match in the final update date and time 311, the terminal apparatus 1 obtained account information from the mail server 22 to update the internal account information table 300. In contrast to this, when logging into the service provided by the server group 2, the terminal apparatus 1 may constantly obtain account information from the mail server 22 (or database server 24).

For this reason, the terminal apparatus 1 does not have to store the account information table 300 internally if the service provided by the server group 2 is not used. Even if the user frequently changes the terminal apparatus 1 for using the service provided by the server group 2, it is possible to match the registration contents of the account information table 300 of the terminal apparatus 1, which the user uses for each time, to the contents of the account information table 300 of the server side.

In the aforementioned embodiment, it was possible for the user to use the standard mail address and the extended mail address by using the extension service. Each of the standard mail address and the extended mail address was registered in the account information table 300. The terminal apparatus 1 performed comparison in the final update date and time 311 at the login time and updated the registration contents of the account information table 300 in agreement with the registration contents of the server side. As a matter of fact, the terminal apparatus 1 can update the registration contents of the account information table 300 at the login time regardless of whether the server group 2 provides the extended mail address as the service.

In the aforementioned embodiment, in the account information update processing in FIG. 12, the mail server 22 obtained the entirety of account information registered in the account information table 300 of the database server 24 for each user ID. However, the mail server 22 may obtain other account information from the database server 24 only when the terminal apparatus 1 is caused to first obtain only the extension service available/unavailable flag 306 from the database server 24 and the flag 306 is set. Since the server name 307, the POP server port number 308, the SMTP server name 309 and the SMTP server port number 310 are rarely updated in the database server 24, no problem occurs in particular. When the extension service available/unavailable flag 306 is reset, the mail server 22 may also reset the extension service available/unavailable flag 306 of the internal account information table 300 without obtaining account information from the database 24. Moreover, the mail server 22 may delete all extended mail addresses 305.

In the aforementioned embodiment, when the user replied to the original mail, another mail address was set as the sender address of the return mail if the address was an extended mail address where the destination address of the original is no longer used. However, there is a possibility that the case in which the destination address of the original mail is no longer used at the time of replying to the original mail will occur even when the address is not the extended mail address. For example, there is a case in which the user, who uses the multiple mail addresses (each having a different domain may be possible), does not use one of the mail addresses. Since the terminal apparatus 1 stores the mail address, which is currently used by the user, the sender address of the return mail can be set to the mail address, which is currently used.

In the aforementioned embodiment, the management server 21, the mail server 22, the multiple game servers 23 and the database server 24, which were connected to one another via the LAN 25, comprised the server group 2. However, the system configuration of the server side is arbitrarily formed. For example, all aforementioned functions of the server group 2 may be implemented on one server apparatus. All aforementioned functions of the server group 2 may be distributed across many server apparatuses.

The other servers 21 to 23 may exchange data of the account information table 300 and the character information table 350 with one another without providing the database server 24. The same functions as the case in which the database server 24 is provided can be achieved as the function of the server group 2 seen from the terminal apparatus 1. Data stored in the database server 24 may not be stored in the other servers 21 to 23. In this case, the servers 21 to 23 may obtain data from the database server 24 as required.

In the aforementioned embodiment, the explanation was given on the assumption that a video game apparatus or a general-purpose personal computer was applied as the terminal apparatus 1. In contrast to this, a portable game apparatus having a configuration where the display device 121 is contained in the same cabinet as that of the video game main body 101 may be used if the apparatus includes the same structural components as those of the video game main body 101 and an Internet connection function. Moreover, a cellular phone can be used if the apparatus includes both a function of executing an application of the network game and an Internet connecting function.

In the aforementioned embodiment, the program and data of the terminal apparatus 1 were stored in the storage medium 131 and distributed. The programs and data of the servers 21 to 24 were stored in the storage medium 220 and distributed. A semiconductor memory card may be used as the storage media 131 and 220 in place of a DVD-ROM or CD-ROM. In contrast to this, programs and data may be prestored to the HDDs 107 and 207. Regarding the storage medium for storing the program and data relating to the present invention, any storage medium may be used according to the physical form of hardware and the distribution thereof.

The programs and data of the terminal apparatus 1 and the programs and data of the servers 21 to 24 may be stored on a fixed disk apparatus provided in a Web server existing on the Internet 3. According to the request from the terminal apparatus 1 or the servers 21 to 24, the Web server may convert the program and data stored in the fixed disk apparatus to a signal and superimpose the signal on a carrier wave, and distribute it to the terminal apparatus 1 or the servers 21 to 24. For example, the program and data, which the communications interface 115 received from the Web server, can be stored in the HDDs 107 and 207 and loaded to the RAMs 105 and 203 at an executing time.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. An account information management system, comprising:

a server that provides at least a mail exchange service and a network game service; and a client terminal connected to said server via a network, said server comprising:

a network game server processor that provides the network game service, the network game service providing a network game;

a character name memory that stores a character name which a user selects to use and selects to stop using in the network game, the character name being a name of a character used in the network game, said character name memory storing the character name as long as the character name is usable in the network game by the user when the user uses the network game service, regardless of whether the user is currently using the network game service;

a character name deleter that deletes the character name from said character name memory when the user stops using the character name in the network game service;

a server side account information memory that stores account information used for mail exchange by the user, the account information including a character name mail address having the character name which the user uses in the network game;

a change confirmer that periodically confirms whether a change in the account information including the character name mail address occurs;

an account information updater that updates the account information stored in said server side account information memory when the change is confirmed to occur;

an account information transmitter that transmits the account information stored in said server side account information memory to said client terminal via the network; and a server side mail exchange processor that executes processing for mail exchange with said client terminal based on the account information stored in said server side account information memory, wherein said account information updater deletes the character name mail address including the character name from said server side account information memory when the character name has been deleted from said character name memory, said client terminal comprising:

an account information receiver that receives the transmitted account information;

a client side account information memory that stores the received account information; and a client side mail exchange processor that executes processing for mail exchange with said server based on the account information stored in said client side account information memory.

2. The account information management system according to claim 1, wherein the account information includes a name mail address having a predetermined name used in another service by the user, wherein the name mail address becomes unavailable when the user stops using the predetermined name, wherein said change confirmer includes a stop determiner that determines whether use of the predetermined name has stopped, and wherein said account information updater deletes the name mail address from said server side account information memory when said stop determiner determines that use of the corresponding predetermined name has stopped.

3. The account information management system according to claim 1, wherein said account information updater updates the account information stored in said server side account information memory when a new mail address is set based on a request from said client terminal, wherein said server further comprises:

a completion notification transmitter that transmits an update completion page including a predetermined control tag when said account information updater updates the account information, and wherein said client terminal further comprises:

an address setting requester that requests said server to set a mail address to be included in the account information via the network;

a receiver that receives a plurality of types of pages, the plurality of types of pages including at least one of the update completion page sent from said server, an extended mailing address setting start page, and an extended mailing address setting page;

a control information detector that receives the predetermined control tag, based on user input from predetermined controls on each of the received pages; and an account information requester that requests said server to transmit the account information when said control information detector detects the predetermined control tag, wherein said account information transmitter transmits the account information stored in said server side account information memory based on the request from said account information requester.

4. The account information management system according to claim 1, wherein said client terminal further comprises:

an account information requester that requests said server to transmit the account information at a time of logging into one of the mail exchange service and the network game service provided by said server, wherein said account information transmitter transmits the account information stored in said server side account information memory based on the request from said account information requester.

5. The account information management system according to claim 4, wherein the account information stored in said server side account information memory comprises first time information indicating a first date and a first time when the account information was last updated in said server side account information memory, wherein the account information stored in said client side account information memory comprises second time information indicating a second date and a second time when the account information was last updated in said client side account information memory, wherein said client terminal further comprises:

a time information obtainer that obtains the first time information included in the account information stored in said server side account information memory via the network at the time of logging into the one of the mail exchange service and the network game service provided by said server; and a time information determiner that determines whether the obtained first time information is the same as the second time information included in the account information stored in said client side account information memory, and wherein said account information requester requests said server to transmit the account information stored in said server side account information memory when the obtained first time information is different from the included second time information.

6. The account information management system according to claim 5, wherein said client terminal further comprises a determiner that determines whether the account information corresponding to the user, who logs in, is stored in said client side account information memory at the time of logging into the one of the mail exchange service and the network game service provided by said server, and wherein said account information transmission requester requests said server to transmit the account information when it is determined that the account information corresponding to the user, who logs in, is not stored.

7. The account information management system according to claim 6, wherein the account information includes user identification information, wherein said client terminal further comprises a user information inputter that inputs identification information of the user, who logs in, at the time of logging into the service provided by said server, and wherein said determiner determines whether the input identification information is stored in said client side account information memory.

8. The account information management system according to claim 1, wherein the account information comprises an SMTP server name and its port number, and a POP server name and its port number.

9. An account information management server connected to a client terminal operated by a user via a network, comprising:

a game server processor that provides a network game service, the network game service providing a network game;

a character name memory that stores a character name which a user selects to use and selects to stop using in the network game, the character name being a name of a character used in the network game, said character name memory storing the character name as long as the character name is usable in the network game by the user when the user uses the network game service, regardless of whether the user is currently using the network game service;

a character name deleter that deletes the character name from said character name memory when the user stops using the character name in the network game;

an account information memory that stores account information used for mail exchange, the account information including a character name mail address having the character name which the user uses in the network game;

an account information transmitter that transmits the stored account information to the client terminal via the network;

a mail exchange processor that executes mail exchange with the client terminal based on the stored account information, a change confirmer that periodically confirms whether a change in the account information occurs; and an account information updater that updates the account information stored in said account information memory when the change is confirmed, wherein said account information updater deletes the character name mail address including the character name from said server side account information memory when the character name has been deleted from said character name memory.

10. The account information management server according to claim 9, wherein the account information comprises a name mail address having a predetermined name used in another service by the user, wherein the name mail address becomes unavailable when the user stops using the predetermined name, wherein said change confirmer includes a stop determiner that determines whether the use of the predetermined name has stopped, and wherein said account information updater deletes the name mail address from said account information memory when said stop determiner determines that the use of the corresponding predetermined name is stopped.

11. The account information management server according to claim 9, further comprising:

an account information updater that updates the account information stored in said account information memory when a new mail address is set based on a request from the client terminal; and a completion notification transmitter that transmits an update completion page comprising a predetermined control tag to the client terminal via the network when said account information updater updates the account information, wherein the predetermined control tag is based on user input from predetermined controls on pages sent to the client terminal, and wherein said account information transmitter transmits the account information stored in said account information memory based on a request sent from the client terminal, which receives the predetermined control tag.

12. The account information management server according to claim 9, wherein said account information transmitter transmits the account information based on a request from the client terminal which logs into a service provided by said server.

13. The account information management server according to claim 9, wherein the account information includes an SMTP server name and its port number, and a POP server name and its port number.

14. An account information management server connected via a network to a client terminal for offering use by a user, comprising:

a program memory that stores a program;

a data memory that stores data;

a processor that executes the program and provides at least a mail exchange service and a network game service, the network game service providing a network game; and a communications apparatus that performs communications processing with the client terminal, wherein said data memory comprises an account information memory that stores account information used for mail exchange by the user, including a character name mail address having a character name which the user uses in the network game, and wherein the program causes said processor to execute:

managing and storing the character name which the user selects to use and selects to stop using in the network game, the character name being a name of a character used in the network game, the managing and storing being for as long as the character name is usable in the network game by the user when the user uses the network game service, regardless of whether the user is currently using the network game service;

deleting the character name from said character name memory when the user stops using the character name in the network game;

periodically confirming whether a change in the account information of the user including the character name mail address occurs;

updating the account information stored in said server side account information memory when the change is confirmed to occur;

deleting the character name mail address including the character name from said server side account information memory when the character name has been deleted from said character name memory;

managing current account information in the account information memory;

transmitting the managed account information to the client terminal via the network; and performing processing for the mail exchange service with the client terminal based on the managed account information.

15. The account information management server according to claim 14, wherein the program further causes said processor to execute:

updating the managed account information when a new mail address is set based on a request from the client terminal; and transmitting an update completion page comprising a predetermined control tag via the network when the managed account information is updated, wherein the predetermined control tag is based on user input from predetermined controls on pages sent to the client terminal.

16. The account information management server according to claim 14, wherein the program further causes said processor to transmit account information of the user corresponding to a login request when the login request to one of the mail exchange service and the network game service provided by said server is received from the client terminal.

17. An account information managing method executed between a server and a client terminal connected to the server via a network, the server providing at least a mail exchange service and a network game service, the network game service providing a network game, the account information management method comprising:

managing and storing, in a character name memory, a plurality of character names which users select to use and select to stop using in the network game, the plurality of character names being names of characters used in the network game, the managing and storing being for as long as the plurality of character names are usable in the network game by the users when the users use the network game service, regardless of whether the users are currently using the network game service;

storing, in an account information memory, account information used for mail exchange for each of the users, the account information of each of the users including a character name mail address including one of the plurality of character names which each of the users use in the network game;

deleting a corresponding one of the plurality of character names of one of the users from the character name memory when the one of the users stops using the corresponding one of the plurality of character names in the network game;

periodically confirming whether a change in the account information of the one of the users, including the character name mail address of the one of the users, occurs;

updating the account information, stored in the account information memory, of the one of the users when the change is confirmed to occur;

deleting the character name mail address including the corresponding one of the plurality of character names of the one of the users from the account information memory when the corresponding one of the plurality of character names of the one of the users has been deleted from the character name memory;

managing current account information for the users, which is used for mail exchange by the users, in the server;

transmitting the managed current account information from the server to the client terminal via the network;

storing the current account information transmitted from the server to the client terminal, including the character mail addresses having the plurality of character names which the users use in the network game service, in the client terminal; and performing processing for mail exchange between the server and the client terminal based on the current account information managed in the server and the current account information stored in the client terminal.

18. A non-transitory computer-readable medium tangibly embodying a program that, when executed by a computer that provides at least a mail exchange service and a network game service, includes a character name memory and an account information memory, and is connected to a client terminal via a network, causes the computer to execute:

managing and storing, in the character name memory, a plurality of character names which users select to use and select to stop using in a network game provided by the network game service, the plurality of character names being names of characters used in the network game, the managing and storing the plurality of character names being for as long as the plurality of character names are usable in the network game by the users when the users use the network game service, regardless of whether the users are currently using the network game service;

storing, in the account information memory, account information used for mail exchange for each of the users, the account information of each of the users including a character name mail address including one of the plurality of character names which each of the users uses in the network game;

deleting a corresponding one of the plurality of character names of one of the users from the character name memory when the one of the users stops using the corresponding one of the plurality of character names in the network game;

periodically confirming whether a change in the account information of the one of the users, including the character name mail address of the one of the users, occurs;

updating the account information, stored in the account information memory, of the one of the users when the change is confirmed to occur;

deleting the character name mail address including the corresponding one of the plurality of character names of the one of the users from the account information memory when the corresponding one of the plurality of character names of the one of the users has been deleted from the character name memory;

managing current account information for the users, which is used for mail exchange by the users, in a predetermined area of a data memory;

transmitting the managed current account information to the client terminal via the network; and performing processing for the mail exchange service with the client terminal based on the managed current account information.

\* \* \* \* \*

UNITED STATES PATENT AND TRADEMARK OFFICE
CERTIFICATE OF CORRECTION

| | |
|---|---|
| PATENT NO. | : 7,814,156 B2 |
| APPLICATION NO. | : 10/960480 |
| DATED | : October 12, 2010 |
| INVENTOR(S) | : H. Sasaki et al. |

It is certified that error appears in the above-identified patent and that said Letters Patent is hereby corrected as shown below:

On the Cover Page (56) References Cited, Foreign Patent Documents, delete "JP 07-183890".

At column 26, line 28 (claim 1, line 22), change "service;" to --;--.

Signed and Sealed this
Eighth Day of March, 2011

David J. Kappos
*Director of the United States Patent and Trademark Office*